(12) United States Patent
Masters et al.

(10) Patent No.: US 6,820,602 B1
(45) Date of Patent: Nov. 23, 2004

(54) HIGH ENERGY IGNITION METHOD AND SYSTEM

(75) Inventors: Stephen C. Masters, El Paso, TX (US); Douglas B. Waits, El Paso, TX (US)

(73) Assignee: Autotronic Controls Corporation, El Paso, TX (US)

( * ) Notice: Subject to any disclaimer, the term of this patent is extended or adjusted under 35 U.S.C. 154(b) by 0 days.

(21) Appl. No.: 10/723,068

(22) Filed: Nov. 26, 2003

(51) Int. Cl.$^7$ ................................................ F00P 9/00
(52) U.S. Cl. ............. 123/609; 123/406.59; 123/406.58
(58) Field of Search ................................ 123/609, 610, 123/406.59, 406.58

(56) References Cited

U.S. PATENT DOCUMENTS

| | | |
|---|---|---|
| 4,095,576 A | 6/1978 | Hattori et al. |
| 4,117,819 A | 10/1978 | Jarrett et al. |
| 4,161,936 A * | 7/1979 | Volsky ........................ 123/606 |
| 4,167,927 A | 9/1979 | Mikami et al. |
| 4,170,209 A | 10/1979 | Petrie et al. |
| 4,176,645 A | 12/1979 | Jundt et al. |
| 4,197,767 A * | 4/1980 | Leung ........................... 477/98 |
| 4,198,936 A | 4/1980 | Pagel et al. |
| 4,249,130 A | 2/1981 | Goss |
| 4,253,443 A | 3/1981 | Seeger et al. |
| 4,275,701 A | 6/1981 | Arguello et al. |
| 4,292,569 A | 9/1981 | Gerry |
| 4,351,287 A | 9/1982 | Shirasaki et al. |
| 4,365,186 A | 12/1982 | Gerry |
| 4,367,722 A | 1/1983 | Mizuno |
| 4,378,778 A | 4/1983 | Harter |
| 4,434,779 A | 3/1984 | Yamamoto et al. |
| 4,446,843 A | 5/1984 | Rumbaugh et al. |
| 4,494,509 A | 1/1985 | Long |
| 4,619,241 A | 10/1986 | Yoshinari |
| 4,620,521 A | 11/1986 | Henderson et al. |
| 4,711,226 A | 12/1987 | Neuhalfen et al. |
| 4,750,467 A | 6/1988 | Neuhalfen |
| 4,773,380 A | 9/1988 | Narita et al. |
| 4,776,311 A | 10/1988 | Venieres et al. |
| 4,787,354 A | 11/1988 | Wilens et al. |
| 4,892,080 A * | 1/1990 | Morino et al. ............... 123/604 |
| 5,043,900 A | 8/1991 | Allen et al. |
| 5,056,497 A | 10/1991 | Akagi et al. |
| 5,143,553 A | 9/1992 | Mukaihira et al. |
| 5,168,858 A | 12/1992 | Mong |
| RE34,183 E | 2/1993 | Wilens et al. |
| 5,188,088 A | 2/1993 | Stamm et al. |
| 5,193,514 A | 3/1993 | Kobayashi et al. |
| 5,456,241 A | 10/1995 | Ward |
| 5,553,594 A | 9/1996 | Ehlers et al. |
| 5,913,302 A | 6/1999 | Ruman et al. |
| 5,924,404 A | 7/1999 | Ruman et al. |
| 6,006,156 A | 12/1999 | Tozzi |
| 6,100,701 A | 8/2000 | Hoy et al. |
| 6,142,130 A | 11/2000 | Ward |
| 6,196,208 B1 | 3/2001 | Masters |
| 6,283,103 B1 | 9/2001 | Hoeflich |
| 6,505,605 B2 | 1/2003 | Yamada et al. |

* cited by examiner

Primary Examiner—John T. Kwon
(74) Attorney, Agent, or Firm—Fitch, Even, Tabin & Flannery

(57) ABSTRACT

A system and method of managing the energy stored in a single ignition coil of a distributor inductive ignition for an engine is described. The engine comprises a plurality of cylinders and the ignition coil having dwell control parameters. The engine is operated at different operating speeds. At least one engine performance parameter is determined. At least one dwell control parameter of the ignition coil in all of the different speeds is adjusted, the adjustment based at least in part upon an evaluation of the at least one engine performance parameter. The cylinders of the engine are fired. The stored energy of the ignition coil is altered to an optimum value between the firings of the engine cylinders, the altering being effected for each of the different speeds and as a result of the adjusting of the dwell control parameters.

34 Claims, 27 Drawing Sheets

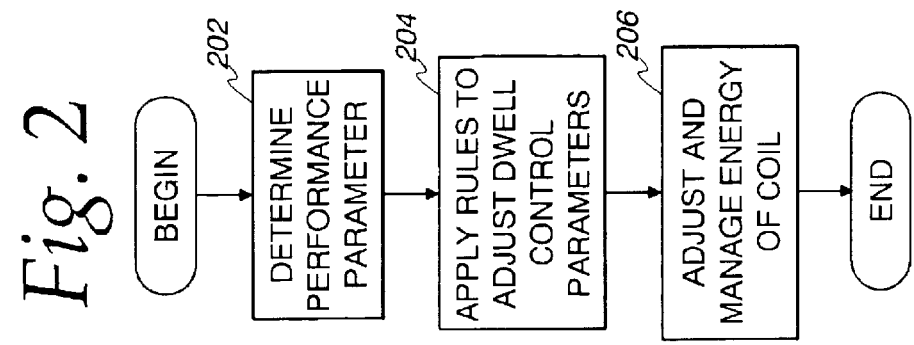
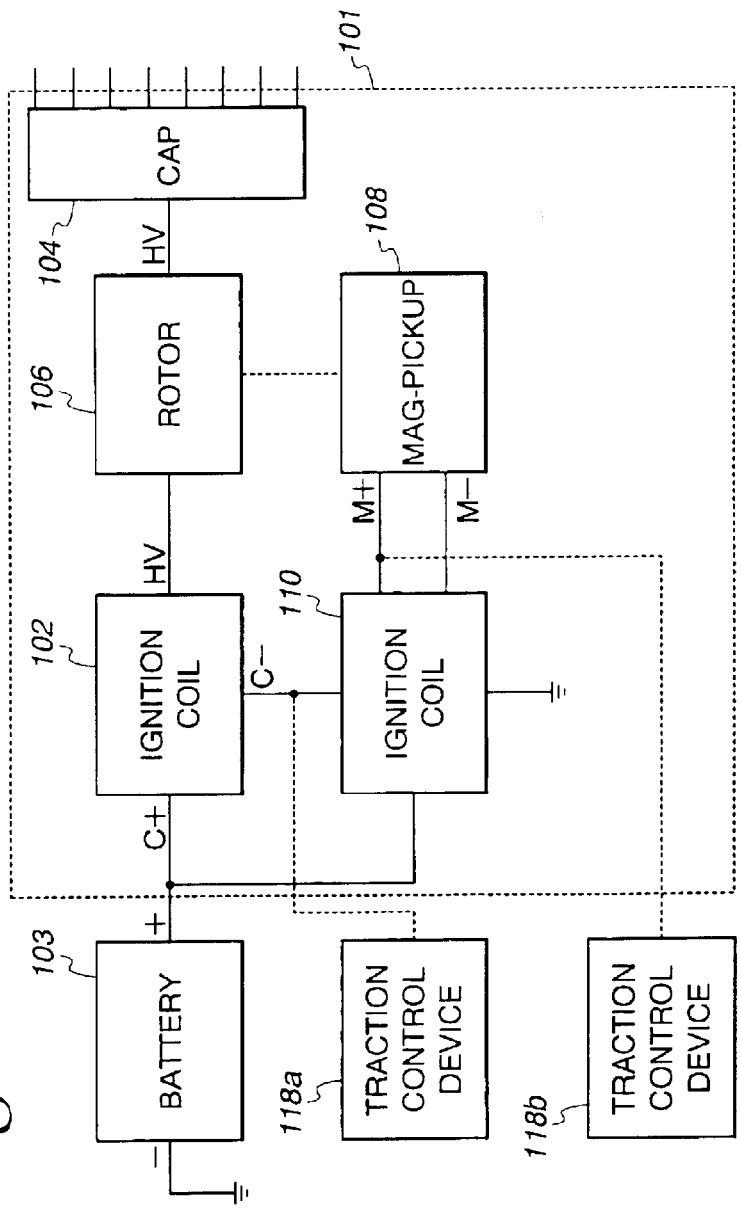

Fig. 3ac

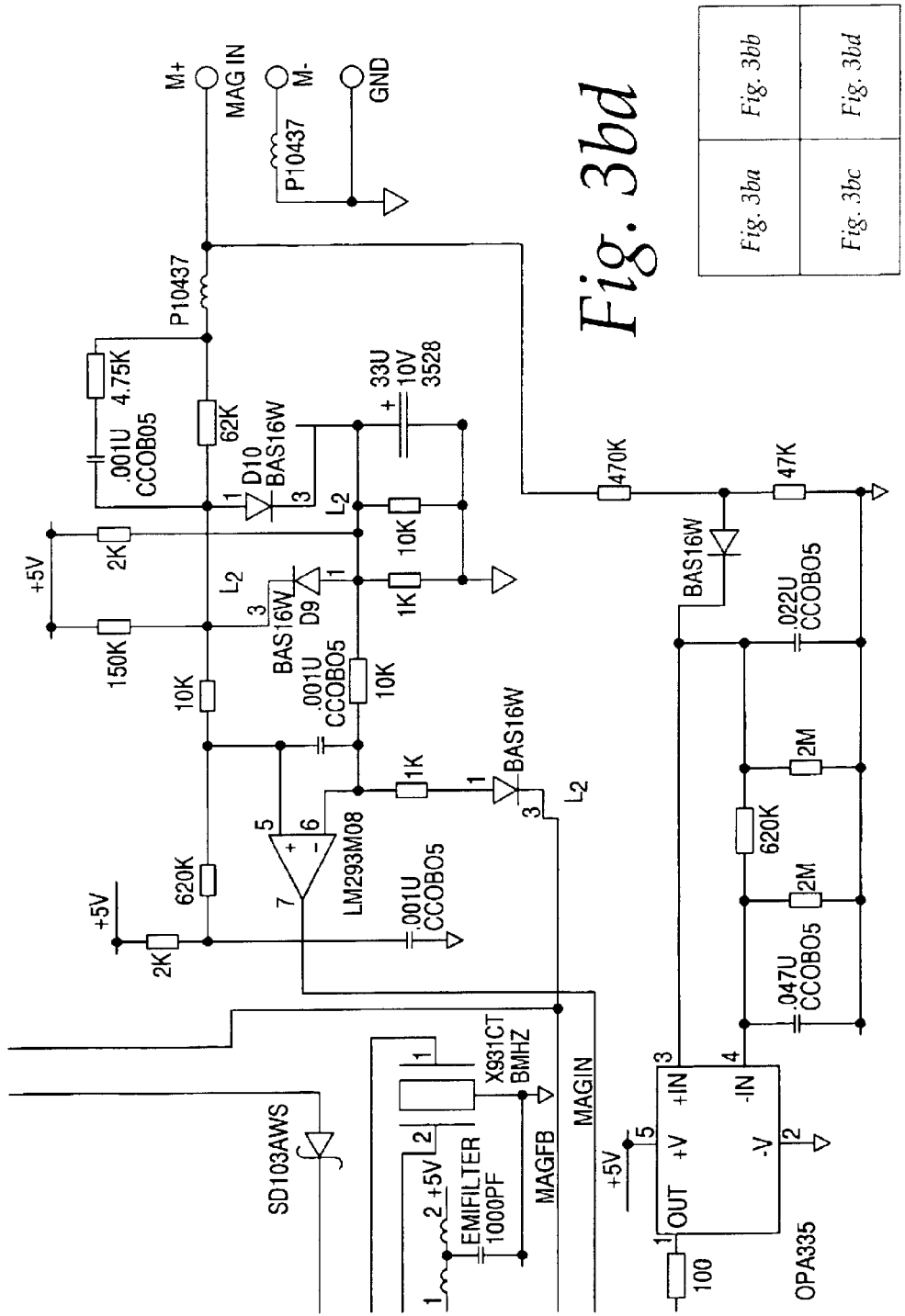

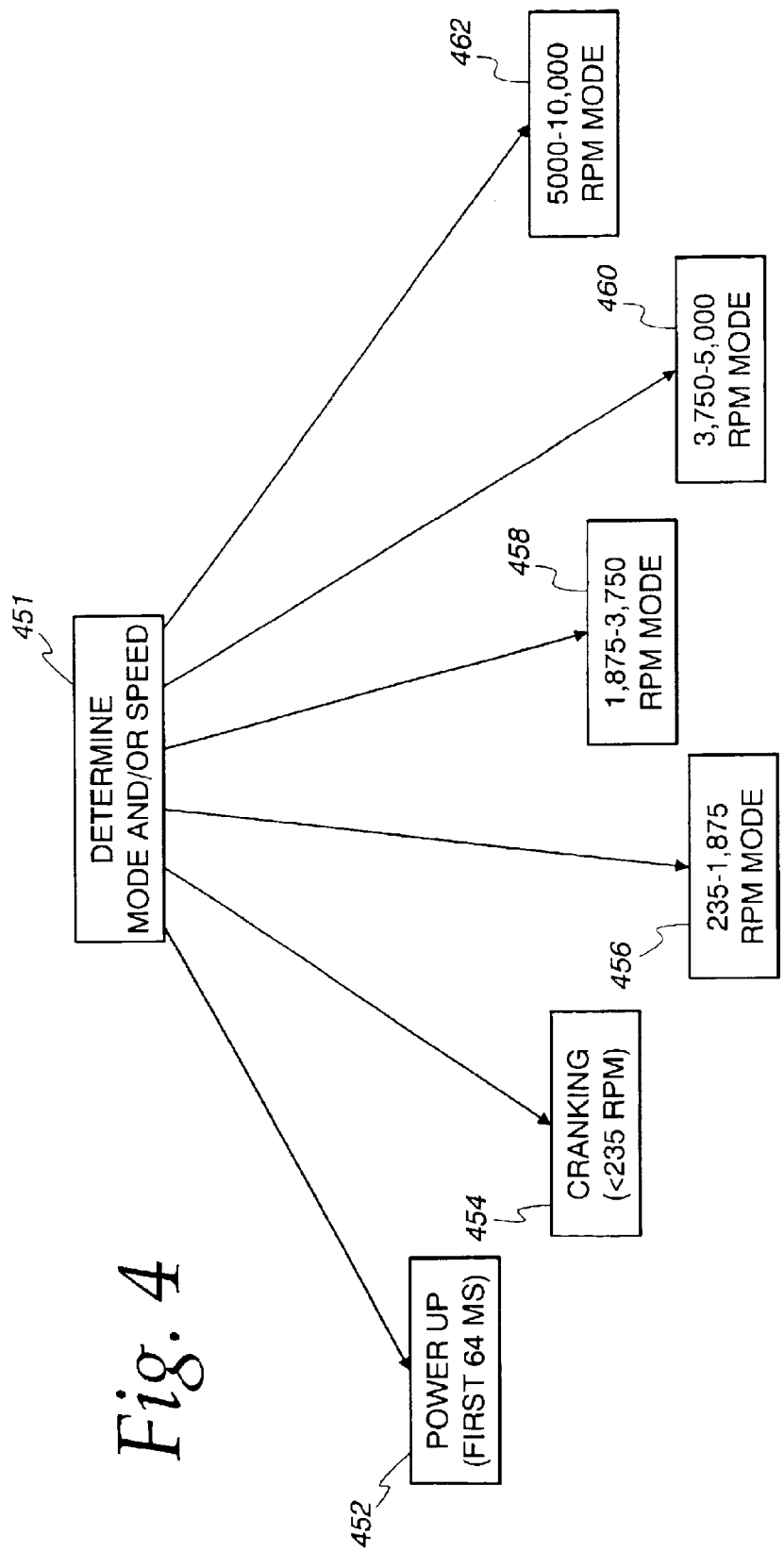

HIGH ENERGY IGNITION METHOD AND SYSTEM

FIELD OF THE INVENTION

The field of the invention relates to engine control systems for motor vehicles and more particularly to high energy ignition control systems for motor vehicles.

BACKGROUND OF THE INVENTION

An internal combustion engine operates when sparks are applied by spark plugs to a homogenous air and fuel mixture in the combustion chambers of the engine. After application of the spark to the mixture in the combustion chambers, the sparks ignite the mixture, causing the engine to rotate the crank shaft of the engine. The spark energy is generated by an ignition coil and the time that the current is applied to the ignition coil primary is usually referred to as the dwell or on-time of the ignition coil primary.

Ignition systems may be divided into inductive ignition systems and capacitive discharge ignition (CDI) systems. Inductive ignition systems can further be divided into distributor systems and distributor-less (DIS) systems.

In an inductive, distributor-based system, energy is stored in the coil primary inductance and transferred to a coil secondary inductance and then to the spark plugs for each of the cylinders of the engine. At low speeds, the energy stored in the ignition coil is totally discharged to effect the spark. However, at high speeds, residual energy typically remains stored in the ignition coil even after the spark is discharged. Since distributor-based systems only have a single coil, they can only fire the spark plugs every 90 degrees of crankshaft rotation. Thus, with an 8 cylinder engine, 720 degrees is needed to fire all of the cylinders in the engine.

In a DIS system, multiple ignition coils are used to deliver energy to the spark plugs of the cylinders of the engine. This setup may also include using multiple ended coils, for waste spark DIS, of the same coil to deliver energy to different spark plugs. In waste spark DIS systems, a spark is fired once every 360 degrees. In some coil-per-cylinder DIS, no waste spark is used firing the coil/plug once every 720 degrees. Since a spark is not fired as often in DIS systems as in distributor-based systems, all of the energy from the coil is transferred to the spark plugs before the next ignition cycle begins. In other words, with each ignition cycle, there is no energy remaining in the ignition coils and the ignition coil current begins ramping from a value of zero amperes. In addition, since no residual energy storage occurs in DIS systems between cylinder firings, simple fixed ontime dwell control is usually used in such systems.

In CDI systems, a battery voltage is stepped up to over 400 volts and the energy is stored in a capacitor. The capacitor stored energy is charged by the battery voltage to be later discharged in the ignition coil primary to generate a spark from the ignition secondary to the spark plug. A CDI system may use single or multiple ignition coils. Dwell time control is not provided in CDI systems.

Ignition systems can be coupled to various types of devices. For example, traction control devices are often used to control traction of the vehicle and can be connected directly to the ignition coil of the engine or the ignition mag-input. Traction control devices adjust the operation of the engine so that when the vehicle loses traction, the driver can regain control of the vehicle. Although valuable in normal passenger driver applications, traction control devices are forbidden in most high-speed racing applications, since they give an unfair advantage to drivers employing these devices.

SUMMARY OF THE INVENTION

A system and method for adjusting the dwell control parameters in an electronic distributor inductive ignition driving a single ignition coil for an internal combustion engine is provided. The ignition coil stores high energy at all engine operating speeds for high horsepower, high compression racing engines while at the same time providing efficient energy storage and performance at lower speeds. Advantageously, the control device is provided as a compact unit and included as part of the existing distributor assembly of the vehicle.

Previous distributor-based, single ignition coil systems are incapable of effectively managing the energy stored in the ignition coil for all speeds of the engine using dwell control. When dwell control was attempted at all, it was made imprecisely and/or was incapable of controlling a high current ignition coil with low inductance and high energy storage and low power dissipation at high power levels under all operating conditions. Consequently, these previous systems could not effectively manage the stored energy or residual energy of the coil at lower speeds and, at the same time, provide the full stored energy needed by the engine at higher speeds. Undesirable consequences often occurred in previous systems, for instance, the burning out the ignition coil at some speeds and the inability to provide the proper energy at other speeds of operation.

In the system and method of the present invention, dwell control parameters are adjusted in an electronic inductive ignition driving an ignition coil in a highly precise manner providing effective energy management of the energy stored in the ignition coil for all operating speeds and conditions of the engine. The dwell control parameters are managed and adjusted based upon such factors as the operating speed range of the engine, the operating mode of the engine, and how well the engine is performing. Energy and residual energy is thereby stored and managed such that efficient low-speed operation is provided while, at the same time, providing full stored energy at operation at higher speeds. Thus, in contrast to previous systems, the present system and method prevents damaging the coil at some operating speeds while at the same time providing surplus energy storage in the coil at other speeds by efficient and precise control of the stored energy and residual energy in the coil for all operating speeds and modes of the engine.

In one approach, the present system and method manages the excess dwell period of the ignition coil primary current. The excess dwell control is responsive to engine acceleration at lower speeds and at higher speeds, which can exceed 6000 RPM per second. Advantageously, the present approach provides for greater amounts of excess dwell at lower speeds and lesser amounts of dwell at higher speeds thereby giving the engine the ability to accelerate rapidly.

The excess dwell may also be adjusted based upon the operating mode of the engine. For example, in cranking mode, no excess dwell is provided. In other operating speed ranges, proportional dwell control is used.

In addition, the excess dwell may be adjusted based upon how well the engine is performing. Specifically, a target excess dwell (margin) is selected and the deviation from a target margin is measured by the system. If the deviation is above an acceptable limit, then an increased margin value is selected. Conversely, a reduced target margin value is used when the present margin value has been observed to be more than adequate for a preselected number of operating ignition cycles. In other words, the margin is selected that gives the minimum excess dwell but still allows full energy for the cylinders of the engine.

Other parameters relating to the coil ignition timing may also be adjusted to manage the energy stored in the ignition coil. For example, the instantaneous coil off time is adjusted by detecting the number of missed excess dwell cycles or the number of double excess dwell errors. Other dwell control parameters may also be adjusted as described herein.

Besides the benefits mentioned above, the present system and method provides other advantages. For example, under some circumstances, it is important to be able to slow the speed or revlimit the engine. By providing dwell time control, the engine is efficiently revlimited without wasting stored energy and without storing energy when the engine speed is greater than the user preselected value. The system may also be quickly returned to a non-revlimited mode of operation with full stored energy after only several ignition cycles.

The present system and method allows the detection of traction control device. For example, a traction control device may be connected to the ignition control system and this device may be detected by the present system. This may be accomplished by sensing the voltage at the coil switch terminal and/or the input duty cycle or sensing a change in amplitude of the mag-pick up input signal. The detection of a traction control device causes the present system to enter a studder mode of operation, indicating such a traction device has been detected and is interfering with ignition and traction control device operation. The detection could result in other actions taken such as indication by alternate mode of tach output operation or a fault indicated at power on that has a timeout reset. The detection of traction control devices is particularly advantageous to detect cheaters in high-speed racing applications where the traction control devices are most often forbidden.

The present system is provided in a compact housing that can easily be integrated into the existing distributor housing of a vehicle. In this regard, a small microprocessor and dual IGBT transistors may be used to provide adjustments for the dwell control parameters. These devices may be included on an insulated metal substrate providing efficient thermal energy management. The substrate can easily be mounted within typical ignition distributors.

BRIEF DESCRIPTION OF THE DRAWINGS

FIG. 1 is a diagram showing the HEI system in accordance with one embodiment of the invention;

FIG. 2 is a flowchart showing the operation of the HEI system in accordance with one embodiment of the invention;

FIG. 4 is a flowchart of the operation of the HEI system in accordance with one embodiment of the present invention;

Figure 3A:
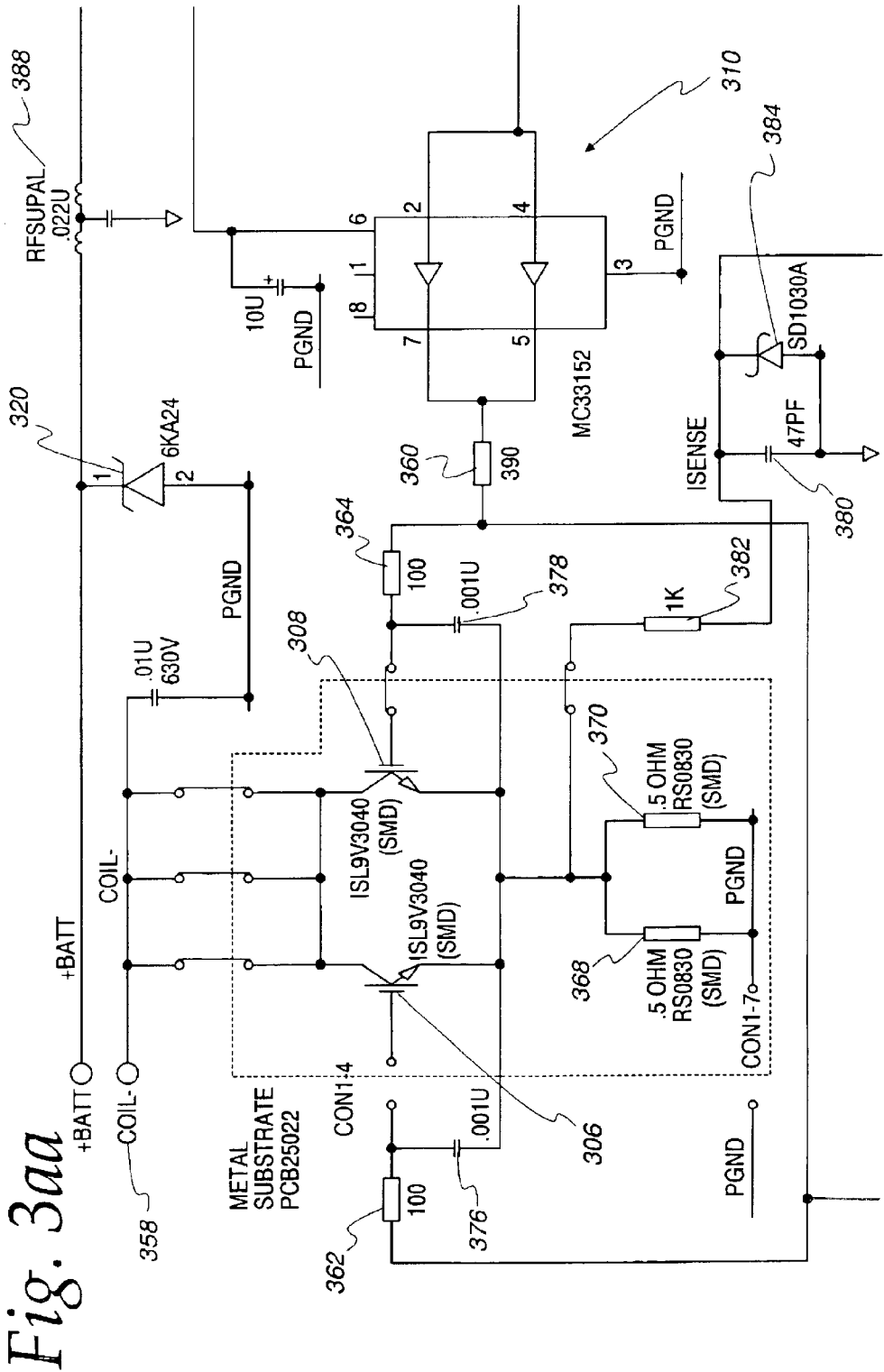
FIG. 3a is a schematic circuit diagram showing a control system in accordance with one embodiment of the present invention.
Figure 3A:
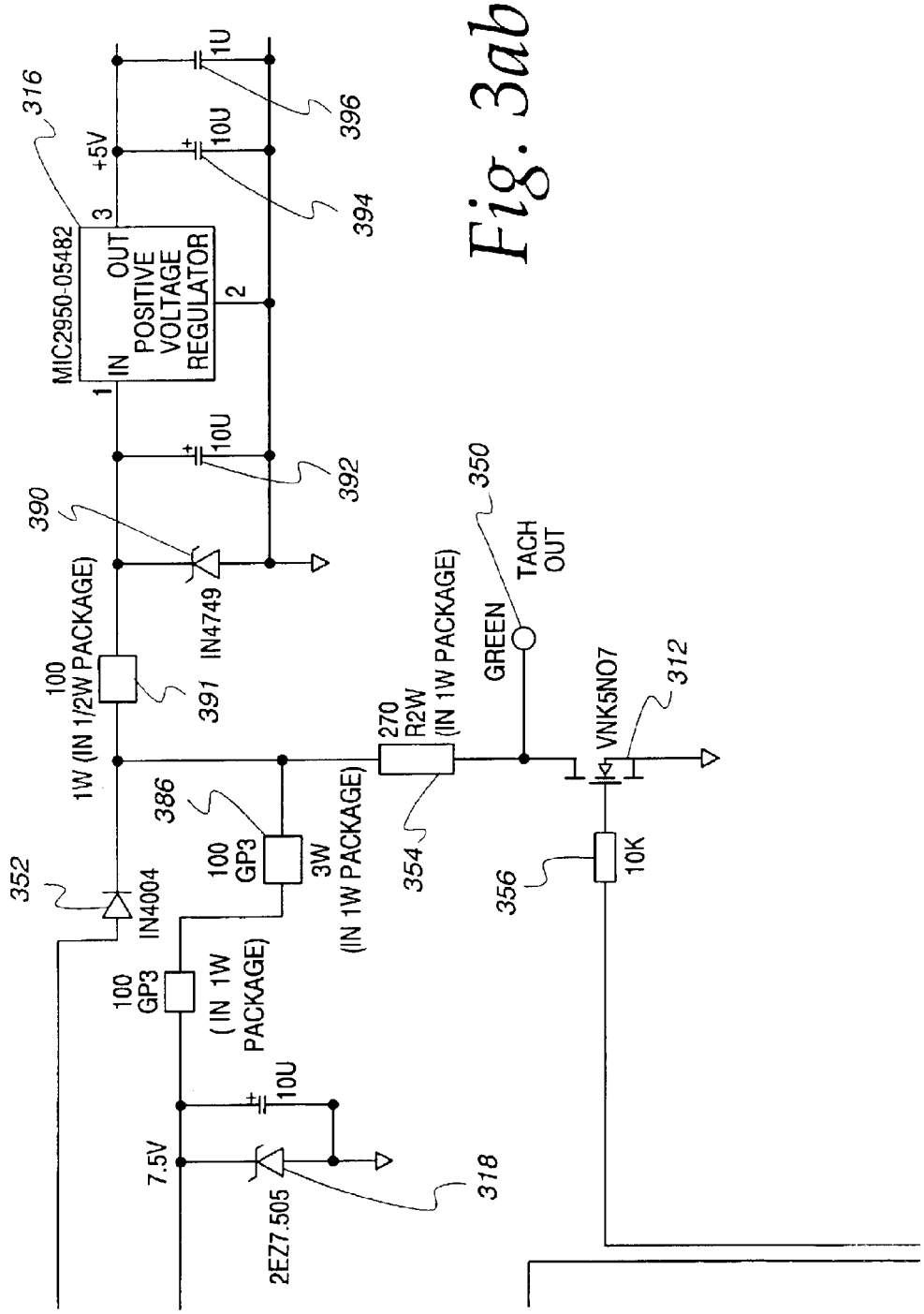
Figure 3A:
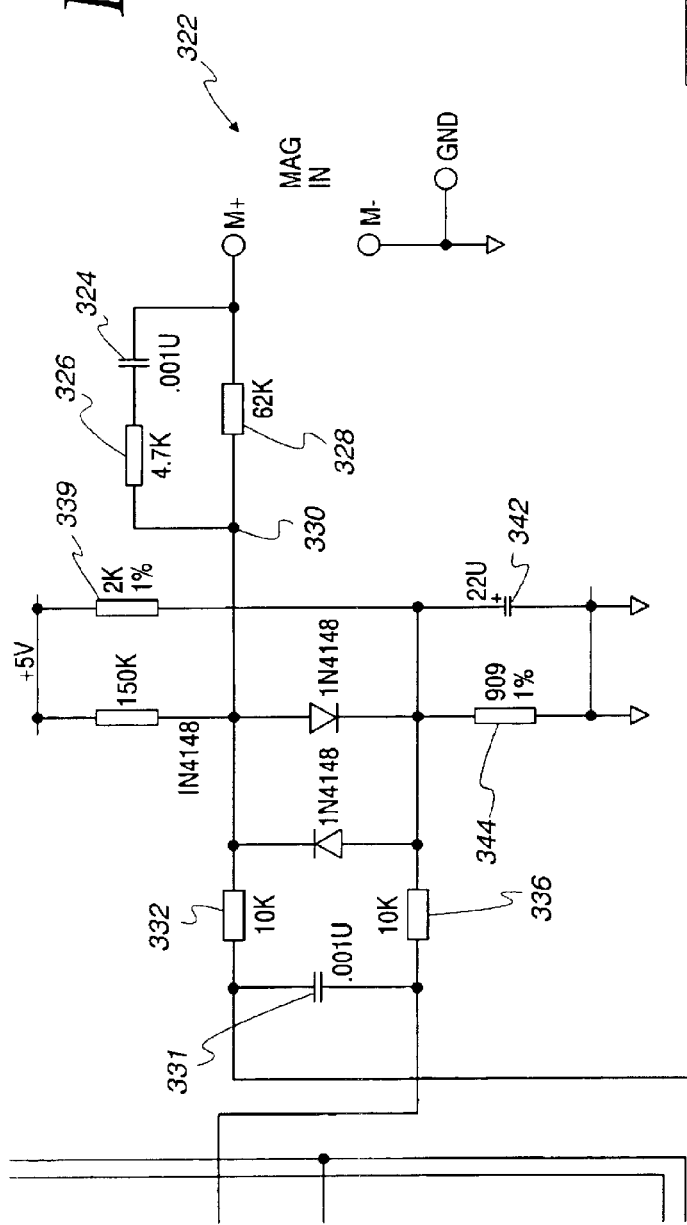

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION OF THE PREFERRED EMBODIMENTS

Referring now to FIG. 1, a system for adjusting the dwell control parameters includes a distributor 101 includes a single ignition coil 102, a distributor cap 104, a rotor 106, a mag-pickup 108 (providing a mag-input signal M+ and M−), and an ignition control module 110. Optionally, a traction control device 118a and 118b may be coupled to the ignition coil 102 or ignition control 110 as shown. The distributor cap 104 is coupled to the spark plugs of the cylinders of the engine. A battery 103 supplies current to the ignition coil 102.

The dwell control parameters of the inductive ignition coil 102 are adjusted in a highly precise manner by the control module 110 providing effective energy management of the energy stored in the ignition coil 102 for all operating speeds of the engine. The dwell control parameters may include a ramp time of the ignition coil, an excess dwell time period of the ignition coil, an instantaneous turn-on time of the ignition coil, a turn-off time period of the ignition coil, and an instantaneous turn-off time of the ignition coil. The dwell control parameters are managed and adjusted by the control module 110 based upon such factors as the operating speed range of the engine, the operating mode of the engine, and how well the engine is performing. Energy and residual energy in the coil 102 is thereby stored and managed such that efficient low-speed operation is provided while, at the same time, providing full stored energy at operation at higher speeds.

In one approach, the present system and method manages the excess dwell period of the engine. For example, no excess dwell time adjustments are made when the engine is operating in a cranking mode. In another example, proportional adjustments are made based upon the operating speed of the engine with larger adjustments being made at lower speeds while smaller adjustments are made at higher speeds.

The excess dwell time is custom tailored to fit the exact operating characteristics of the engine and to each cylinder within the engine according to timing rules. These multiple rules are developed and applied to adjust the excess dwell time. The rules are specific to the operating mode of the engine, the speed range of the engine, and the other measured performance characteristics of the engine. The adjustments to ignition dwell made according to these rules may be made instantaneously or over several ignition cycles. Thus, ignition dwell adjustments are made to each cylinder individually based upon measured performance and not upon rigid and inflexible rules.

FIGS. 6–15 illustrate examples of the ignition timing patterns as a result of applying rules according the present system and method. Preferably, these rules are developed by monitoring and observing the operating characteristics of the engine. In addition, it will be understood that the specific rules described herein may be changed and are examples only.

Figure 6:
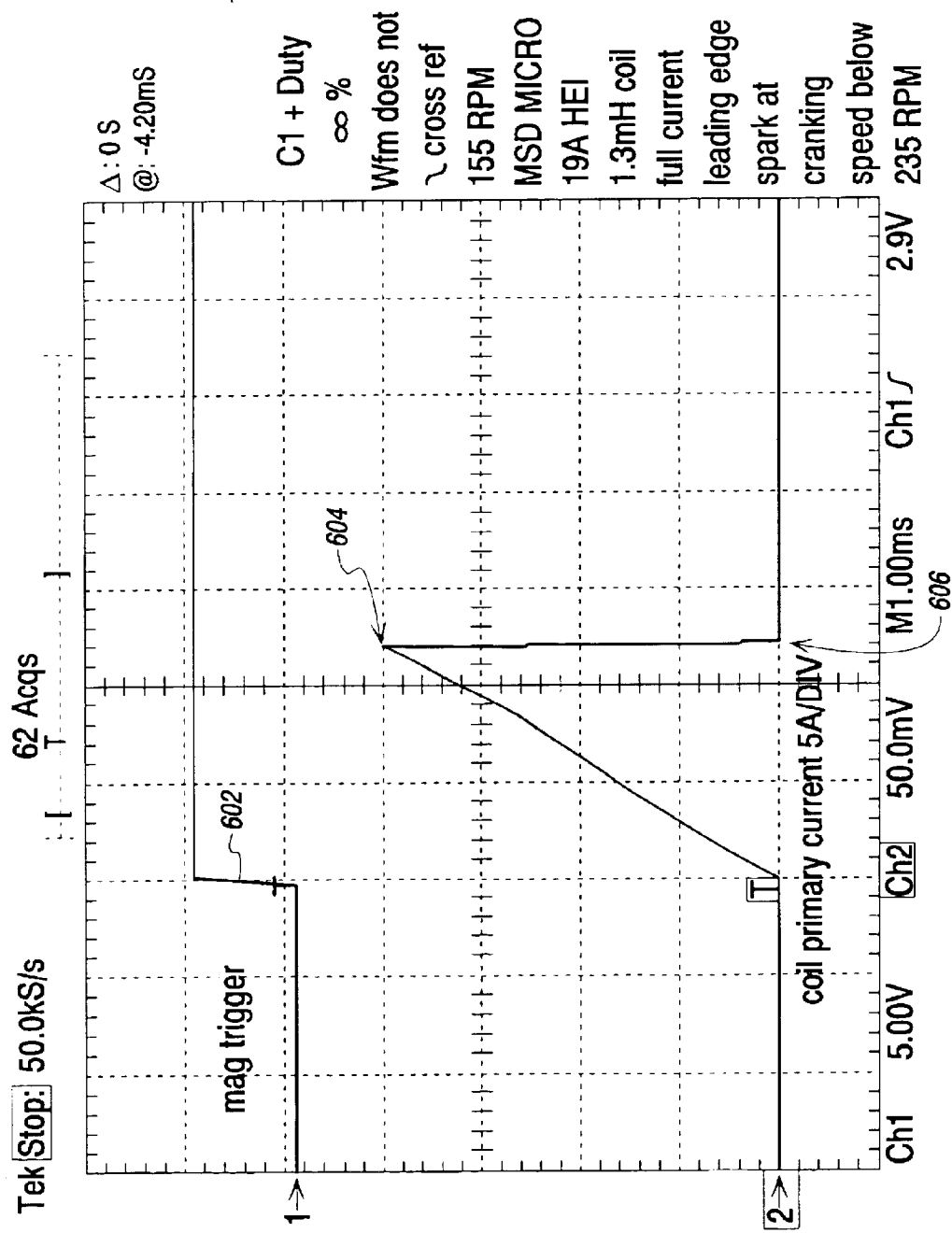
FIG. 6 is a graph of the ignition current of the primary coil during low-speed operation in accordance with one embodiment of the present invention.

Referring to FIG. 6, when the engine is in cranking mode, the coil 102 is activated when the trigger input edge 602 of the magnetic input signal is detected at the zero crossing of that signal, after a debounce period. As soon as the full current level 604 is detected, the coil is turned off by the control module 110 at time 606 and a spark is generated. This timing pattern applies to the cranking mode of operation only. In other words, once the engine speed enters normal operating mode, different parameters are analyzed and used to determine the excess dwell time.

Figure 7:
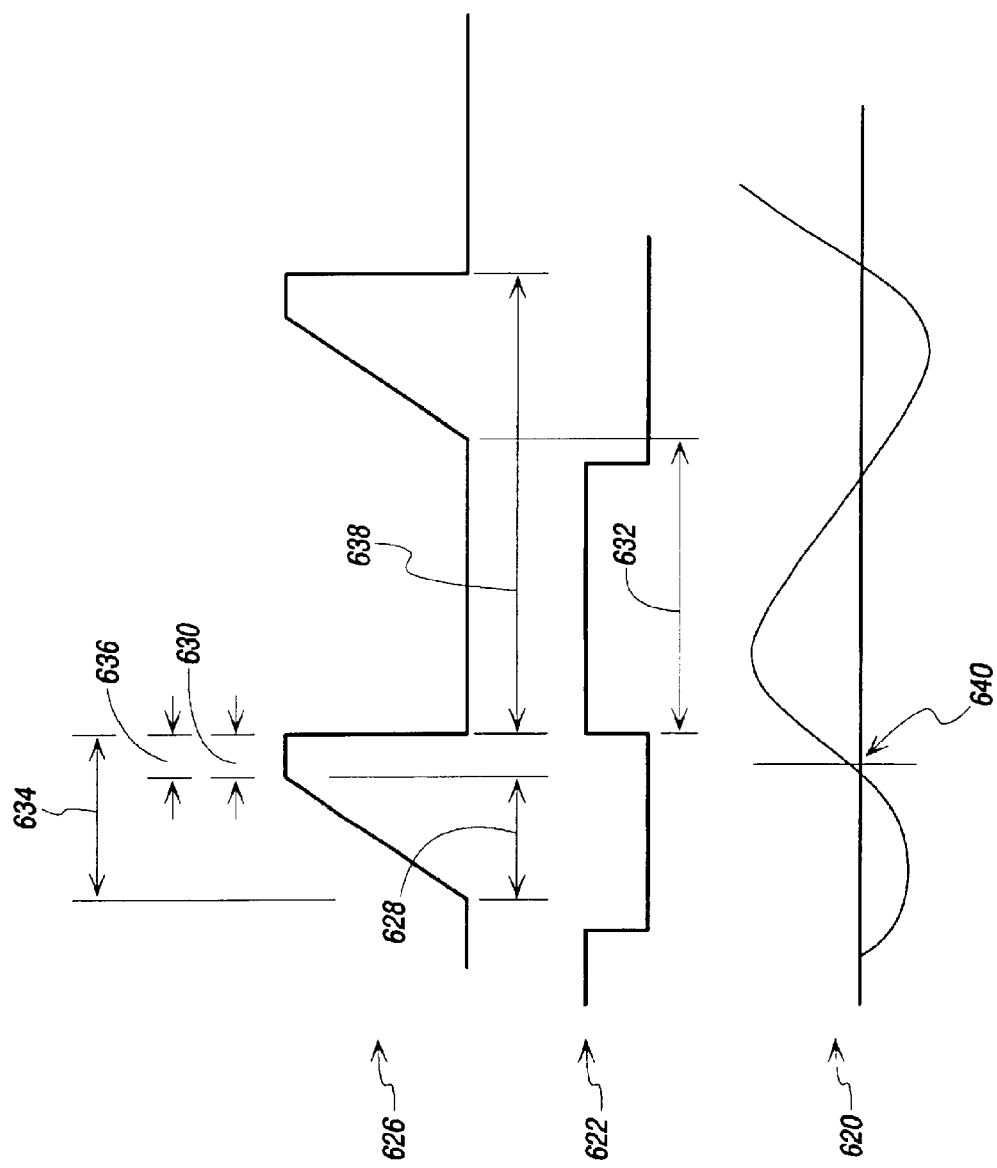
FIG. 7 is a graph of the mag-input voltage, comparator output, and primary coil current in accordance with one embodiment of the present invention.

Referring now to FIG. 7, the engine enters the normal mode after speeding to beyond a threshold value, for instance, at 235 RPM. The mag-input signal 620 is received from the mag pickup 108. As described elsewhere in this application, a comparator within the control module 110 is used to square the mag-input signal 620 to provide an output 622. The control module 110 then adjusts the timing of the primary coil current 626 by adjusting the ramp time 628, the excess dwell time 630 and the delay time 632. By adjusting these times, the dwell time 634 (ramp time 628 plus excess dwell time 630) is necessarily adjusted. As shown, a reference margin 636 is the target value for the excess dwell time and the cycle time 638 is the sum of the dwell time 634 and the delay time 632.

The control module 110 takes the information it receives from the pickup 108 and adjusts the excess dwell time 630 of the engine over a period of engine cycles based upon this information. In one example, predefined ranges of engine speed are programmed in a memory associated with the control module 110. A target margin value is associated with each of these ranges. The control module 110 examines the speed of the engine to determine the rule to use. Based upon the range, the excess dwell time 630 is adjusted to the margin value.

The excess dwell time 630 may be adjusted by having the control module 110 determine the ramp time 628 for the current applied by the coil 102 to the engine, increasing the current to a current limit value over the period of the ramp time 628, and hold the current value to the current limit value for the excess dwell time 630. The control module 110 may then turn off the current supply at the ignition coil primary after the expiration of the excess dwell time 630 at turn-off time 640.

The excess dwell time 630 may be adjusted by also examining the operating mode of the engine. For example, in engine cranking mode, no excess dwell time is used. As the engine speed increases, the dwell time 630 may vary from 45 percent in the first cycle 638 after the engine enters normal operating speed, to less than 1 percent at higher speeds.

In addition, the turn-off time 640 may be adjusted by the control module 110 according to the dwell time. Specifically, the control module 110 may determine whether the coil has reached a full current value during the first cycle 638 and adjust the turn-off time of the next cycle.

The ignition timing may be altered based upon comparisons of the actual excess dwell time 630 to a target margin value 636. Proportional dwell time adjustment is provided by sensing the magnitude of the excess dwell time error from the selected target margin value 636 and selecting a new reduced target margin value when the present margin value 636 has been observed to be more than adequate for a preselected number of operating ignition cycles. A larger margin value 636 is selected at a different number of ignition cycles when the presently selected margin value 636 is found to be inadequate.

In addition, other parameters relating to the coil ignition timing may also be adjusted. For example, the coil off time 632 is adjusted by the control module 110 by detecting the number of missed excess dwell cycles or the number of excess dwell errors.

Figure 8:
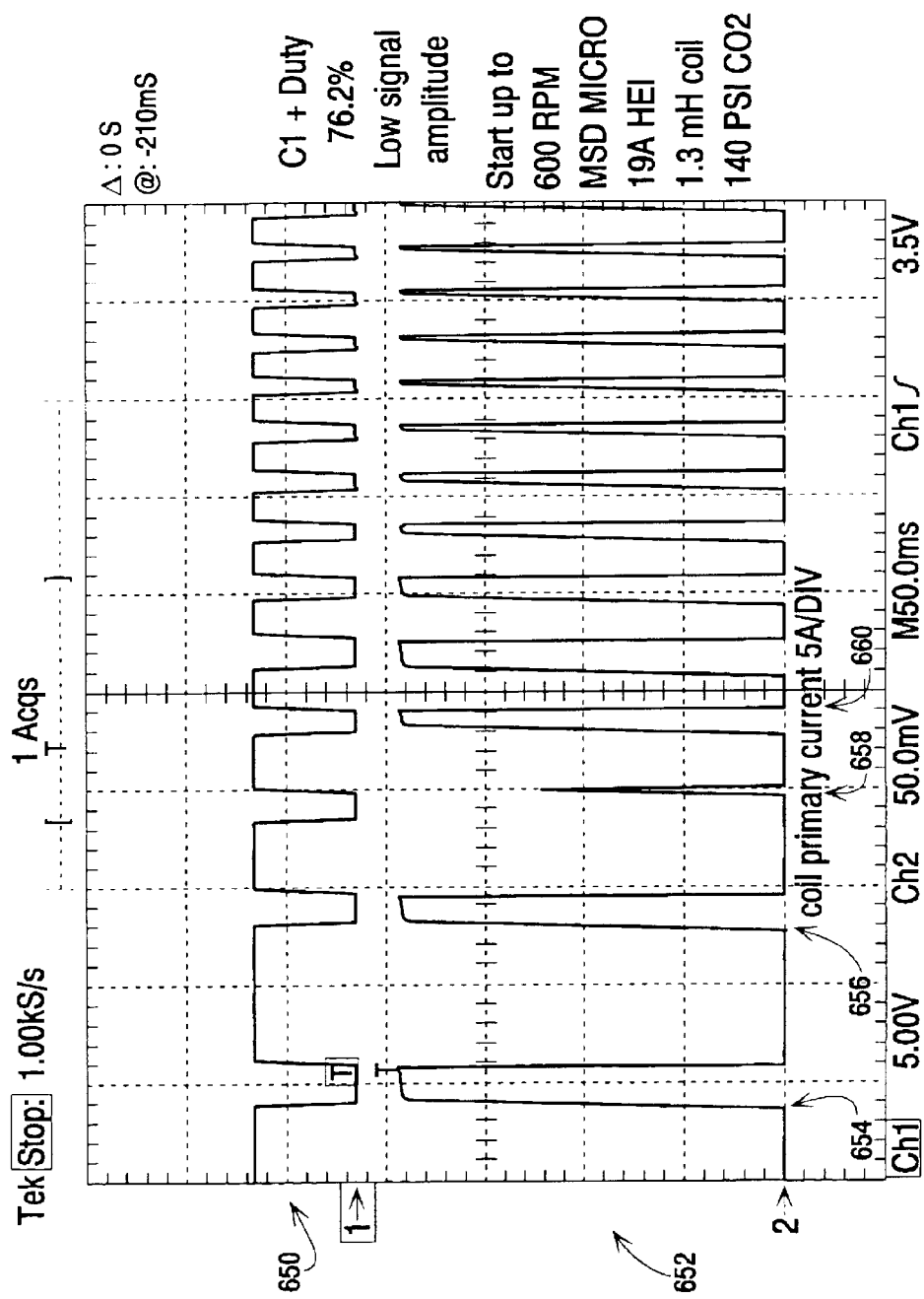
FIG. 8 is a graph of high current ignition during a start up to 600 RPM in accordance with one embodiment of the present invention.

Referring now to FIG. 8, an example of ignition timing is illustrated. The graph shows the high current start-up of the engine to 600 RPM with the coil primary current 652 and the mag input 650. The first and second cycles have the current turned on during periods 654 and 656 on the trailing edge of the mag input signal 650. The third cycle 658 is above 235 RPM so the coil current 652 is turned on at the mag-input trigger edge, ramps up to full current, then turns off to provide a spark. The fourth cycle 660 is on the trailing edge of the mag-input signal 650 and is being calculated at 6 percent dwell decrease per cycle over the next seven cycles.

In some circumstances, the engine is operating too quickly, especially during high speed operations. The present system and method provides a convenient way to limit the speed of the engine. Previous systems inefficiently attempt to revlimit the engine because these systems leave the coil current on or ramp the coil current down, both techniques leading to either residual energy stored in the coil that is wasted or too slow of a response to revlimit the engine.

In the present system and method, the operator can set the operating mode to revlimit. The ignition period is measured and converted to a RPM value to determine when the ignition should inhibit the coil drive to halt the output of sparks. Whenever the engine speed exceeds a revlimit value, the coil 102 is not activated during the next ignition cycle. This causes the engine to misfire and prevents over speeding. Efficiency is enhanced because all the stored energy in the coil 102 is used and the coil is not recharged until the engine speed is reduced below the revlimit value. In this way, the engine is efficiently revlimited without wasting stored energy and without storing energy when the engine speed is greater than the preselected revlimit value. The engine can be quickly returned to normal operating mode with full stored energy after only a few ignition cycles.

Other conditions can affect the ignition timing of the engine. In prior systems, traction is controlled by using a traction control device 118a or b to alter the ignition timing to retard the ignition spark, which effectively reduces torque and horsepower output to keep the vehicle under control. The traction control device 118a or b may be connected to the engine in several ways, for instance, it can be connected to the ignition coil 102. However, by connecting the traction control device 118a or b to the ignition coil 102, the traction control device 118a or b can prolong the coil dwell time and affect ignition timing.

The present system and method detects the presence of a traction control device 118a or b. The traction control device 118a or b is detected, for example, by monitoring the ignition coil voltage level when the coil current is interrupted and then determining that a spark has been generated. If the voltage stays low, it indicates that a traction control device 118a or b is attached.

Another way to detect that a traction control device 118a or b is present is to determine the duty cycle ratio change for the mag-input signal. When the magnitude of the duty cycle is seen to be changing above a certain threshold, then a traction control device has been detected and appropriate action may be taken. Also, a change in the mag-pickup amplitude can indicate a traction control device operation.

Actions may be taken once a traction control device 118a or b has been detected. For instance, a studder mode of operation can be entered. In a studder mode of operation, the ignition output is alternatively placed in revlimit for a predetermined number of cycles. This allows output sparks to be inhibited for a number of cycles to indicate the use of a traction control device 118a or b and to interfere with the operation of the ignition and the traction control device. When the ignition is in revlimit mode, the studder mode is inhibited.

Referring now to FIG. 2, a method for operating a system that adjusts the dwell time for a coil on an engine is described. At step 202, the performance parameters of the engine are determined. The performance parameters may include the operating speed of the engine, the operating mode of the engine, and the performance of the engine during use of a particular margin value. Speed of an engine may be determined. For instance, a sensor may produce a magnetic input signal that is representative of the speed of the engine.

At step 204, rules are applied to adjust the dwell control parameters of the engine. For example, the excess dwell time of the engine is adjusted based at least in part on the engine speed and the mode of engine operations. A controller examines the speed range and the mode of operation of the engine and determines the excess dwell time to use according to a specific rule.

For instance, dwell control parameters are set to certain values at high speeds and other values at low speeds according to predefined rules. The technique used to change the dwell time may also vary based upon the particular rule. Thus, the dwell control parameters of a cylinder is custom tailored to the speed, mode of operation of the engine, and performance characteristics of the engine. For instance, excess dwell may be changed according to some rules for some speed ranges, but not for others. The amount of excess dwell changed may also vary within a speed range. In addition, other dwell control parameters may also be changed.

At step 206, the energy and residual energy of the ignition coil is adjusted and managed as a result of adjusting the dwell control parameters. For instance, the application of the rules allows enough residual energy at high speeds so that full energy can be applied to the spark plugs. The rules also allow for the efficient operation of the engine at lower speeds.

Figure 3B:
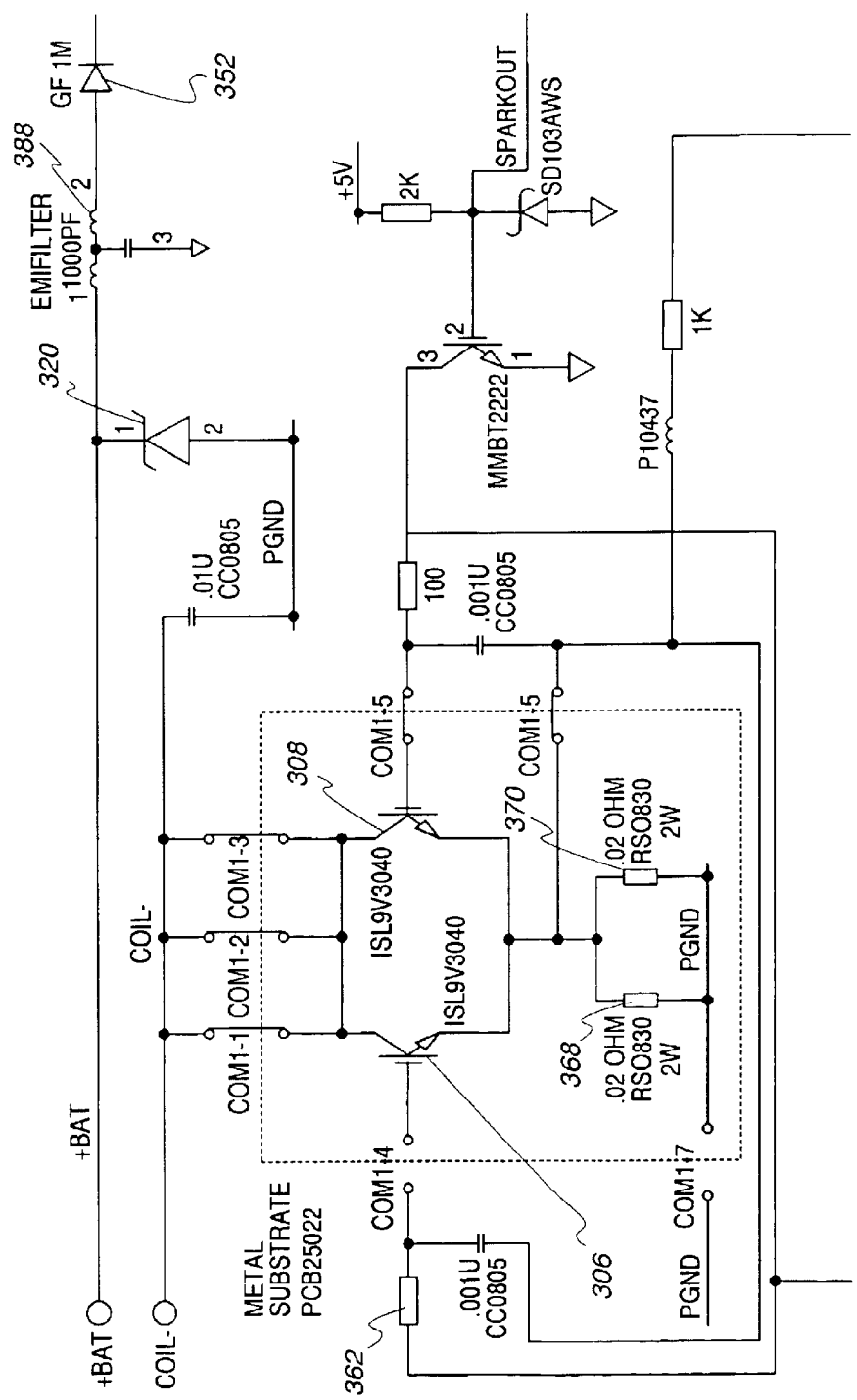
FIG. 3b is a schematic circuit diagram showing a control system in accordance with one embodiment of the present invention.
Figure 3B:
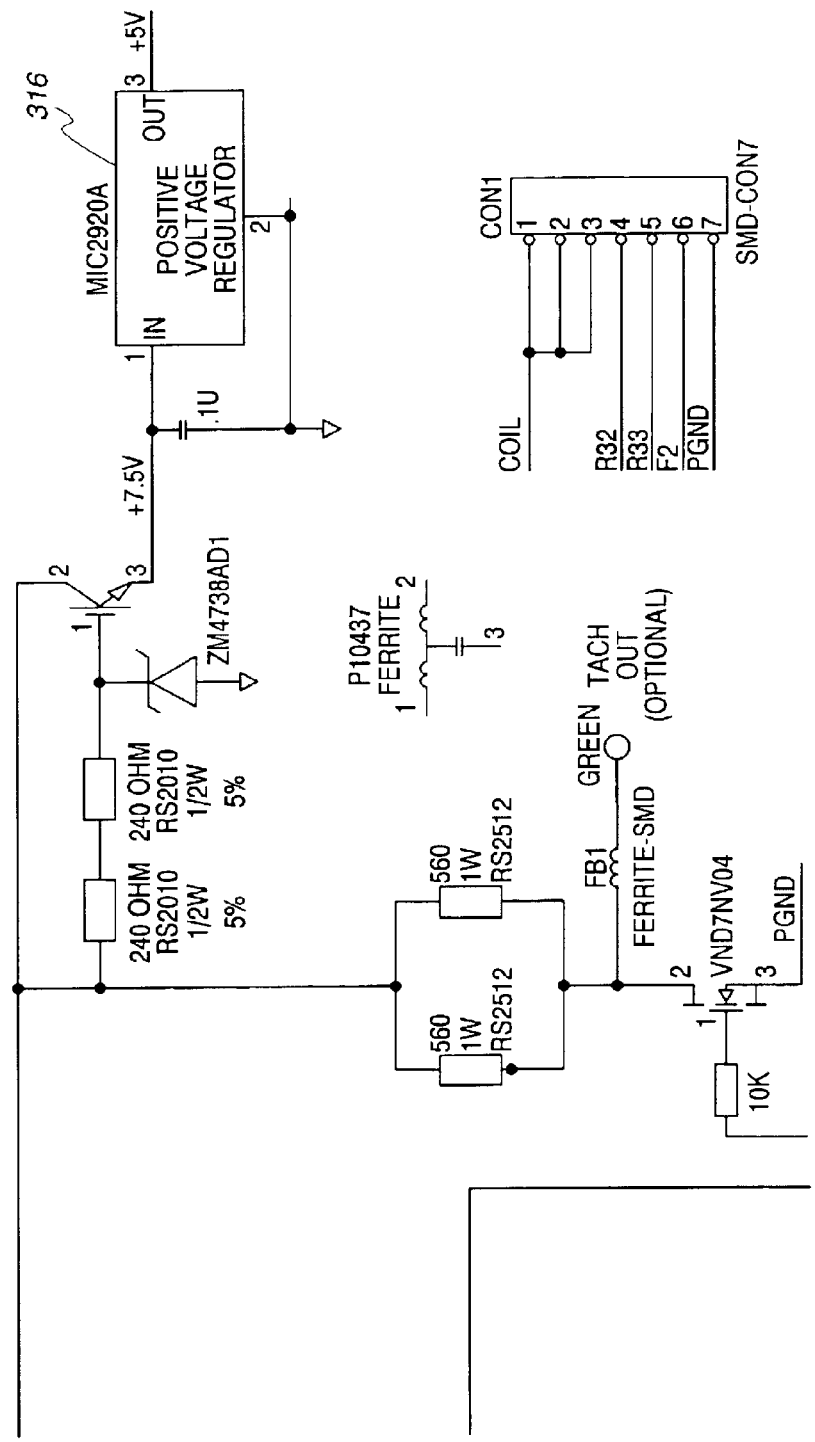
Figure 3B:
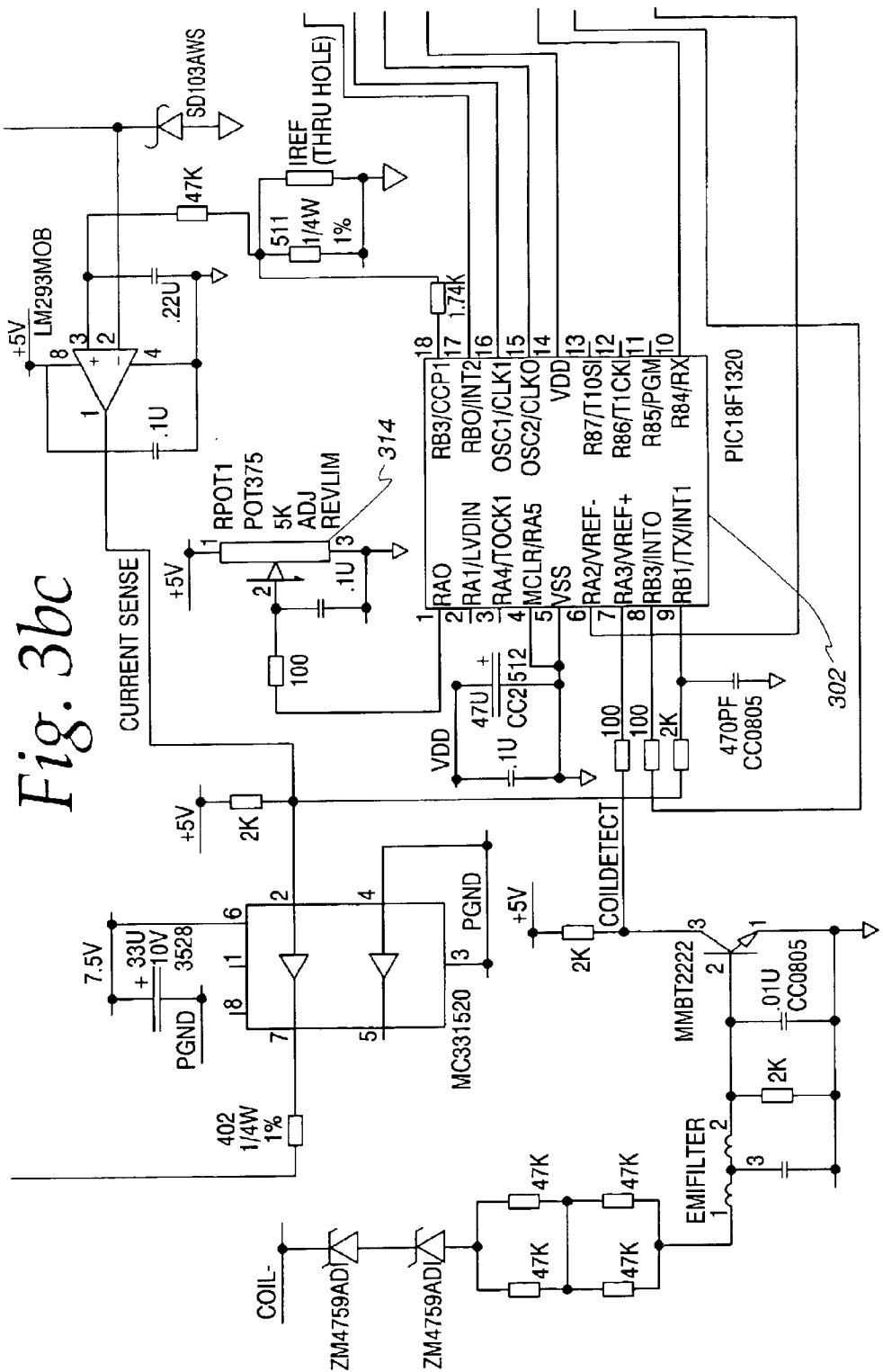

Referring now to FIGS. 3a and 3b, a system for adjusting the excess dwell time and other timing parameters of an engine includes a microcontroller 302. The microcontroller 302 in the preferred embodiment is a device such as an 8-bit PIC16C782 from MicroChip Technology Inc., which is available in a 20-pin package for through hole or surface mounting or a PIC18F1320 in an 18-pin package. The microcontroller 302 receives a clock signal from the external resonator 304.

The microcontroller 302 includes first and second voltage comparator 303 and 305. The first voltage comparator 303 squares the mag-input for ignition timing as well as used for measuring the ignition cycle time. The second voltage comparator 305 is used to measure and control the coil primary current by controlling the bias voltage on the IGBT coil switches 306 and 308. Alternatively, the comparators 303 and 305 may be separate devices from the microcontroller 302.

The microcontroller 302 also includes a digital-to-analog converter 307. The digital to analog converter 307 provides a reference voltage to bias the second voltage comparator 305 to provide a preselected ignition coil current limit reference. This reference is generated by the PWM output, which is low-pass filtered in the PIC18F1320.

The microcontroller 302 has two outputs 311 and 313 that control the IGBTs 306 and 308. Specifically, the output 311 from comparator 305 is connected to a high-speed MOSFET driver 310 for driving the gates of the IGBTs 306 and 308 to a full current level and then providing a lower level of drive voltage to hold a predetermined current limit using high frequency switch mode control of the gate bias voltage to maintain the current limited operation. The driver 310 may be a type such as a MC33152 driver, which is manufactured by Motorola, Inc/On-Semi.

The other output 313 of the microcontroller 302 is connected to the gates of the IGBTs 306 and 308 to effectively ground the gates of the IGBTs 306 and 308, thereby biasing these gates off and interrupting the coil current. This action causes the primary current to collapse and generate an output spark to a spark plug in one of the cylinders of the engine.

An output 315 of the microcontroller 302 transmits a signal of 25 percent duty cycle of the ignition period, which is connected, to the comparator input 343 to cause an inhibit bias voltage at the time of ignition when the mag-input signal received at the input 322 is crossing through zero volts and the spark is being generated. Also, output 315 is connected to the gate of a Smart-FET tach-output transistor 312, which generates an output signal to drive tachometers and other RPM controlled devices with a clean fixed duty cycle signal. The Smart-FET transistor 312 may be a device such as a VNK5N07 manufactured by ST-Microelectronics, Inc.

An analog-to-digital converter 353 is also used by the microcontroller 302. The input 333 to the microcontroller 302 comes from the user adjustable potentiometer 314. Adjusting the potentiometer 314 allows the user to preset a user defined maximum engine speed revlimit value between a minimum low speed and maximum engine speed value.

The microcontroller 302 is supplied with power by a low dropout precision 5-volt regulator 316 and this power flow is filtered and protected from transient voltages by several voltage and current limiting devices connected between the battery and the voltage regulator input. The MOSFET driver is supplied with a zener diode 318 regulated power supply of 7.5 volts, which is filtered and current limited also. The preferred embodiment contains an NPN voltage follower transistor for supplying a regulated 7.5 volts to both the 33152 driver and the input of the 5-volt regulator. The NPN transistor allows for lower battery voltage operation due to the low impedance of the NPN transistor of about 7.5 volts. The main battery supply input is protected from large transients by a high-powered transient surge absorber 320, such as a 6KA24, rated at 6000 W energy clamping capacity, from General Instrument or General Semiconductor, Inc.

The coil driver switch is the pair of ignition IGBTs 306 and 308 such as part ISL9V3040D3S, which are internally clamped to 400–430 volts and manufactured by Fairchild Semiconductor, Inc. The IGBTs 306 and 308 are preferably surface mounted components, which are soldered directly to an aluminum insulated substrate that also includes two surface-mounted resistors in series with the IGBT emitter leads, which are also connected to ground, for providing a low voltage drop current feedback signal to the microcontroller comparator input. The use of an insulated metal substrate for mounting the power transistors and low-ohm power resistors, greatly improves the power dissipation of these components by providing a very efficient, low thermal resistant path, for heat removal to the distributor body.

A special connector may be used to provide the connection between the insulated metal substrate and the dwell control PCB, which mounts all the other ignition components. This connector provides for three-axis movement between the IMS and the PCB due to thermal expansion and vibrations encountered in the distributor housing. This connector may be such a part as an S-TAB header assembly from Autosplice Inc.

The microcontroller 302 is connected to the mag-pickup sensor 322 that is mounted in the distributor housing, which generates an AC-voltage to provide ignition timing reference to the microcontroller 302 and is used for detecting the speed of the engine.

Referring to FIG. 6, the mag-input signal (received at sensor 322 or element 108 in FIG. 1) and the output from the mag-input comparator 303 (waveform 622) in the microcontroller 302 are illustrated. As can be seen, the ignition timing reference is located on the rising edge 602 of the mag input signal as it crosses through zero volts. This graph shows the coil primary current reaching a full current value and then turning off during low speed operation.

The mag-pickup sensor 322 is connected to terminals M+ and M−. The mag-pickup negative terminal is connected to ground and the positive terminal is connected to a capacitor 324 and a resistor 326. The capacitor 324 and resistor 326 form a parallel path, to the resistor 328. This combination constitutes a lead network, which provides compensation to the natural retarding ignition timing caused by the slope change of the mag-input signal from low engine speed to high engine speeds, to keep the ignition timing reference relative to top dead center (TDC) at all operating engine speeds. The action of the lead network causes the voltage at the node 330 to rise to a higher level as the frequency of the mag-input signal 322 increases, which causes the zero crossing to be advanced as the engine speed increases and counters the RC delays caused by the filtering of a resistor 332 and a capacitor 334 at the input of the voltage comparator.

In addition, the capacitor 334, connected across the comparator inputs of the microcontroller 302, is used to limit the maximum dv/dt to less than one volt/microsecond for full temperature rated input of the microcontroller comparator inputs to maintain a known output state of operation. When using a separate voltage comparator, the capacitor 334 is not required, as in the embodiment of FIG. 3b. This lag/lead network balances the retarding effects to keep the ignition timing stable relative to TDC across the entire operating engine speed range within an unsubstantial timing shift. The signal generated at the voltage comparator input 343 of the microcontroller 302 is compared to the reference voltage at input 345 of the microcontroller, which is biased from a resistor 336 connected to divider resistors 338 and 340, which is filtered by capacitor 342. The embodiment of FIG. 3b uses a filter of 47K ohms and capacitor of 0.22 microfarads, which filters the PWM output from the PIC18F1320 to develop a DC current limit reference voltage at the negative voltage comparator input. The Schottky diode connected from anode to ground and cathode to voltage comparator negative input provides protection for the voltage comparator due to negative transients at coil turnoff.

In one example, the bias voltage at an input 343 is about +0.156 volts and the normal voltage seen at an input 345 of the microcontroller 302 is less than the bias voltage until the mag-input rises to about +0.3-volts to cause the comparator output to go high to 5 volts, indicating the zero crossing of the mag-input has been detected. When the comparator output 347 of the microcontroler 302 goes high, the microcontroller 302 then simultaneously generates an output 315 with a 25 percent duty cycle signal for pulling the comparator input 343 low via a resistor 344 and diode 346 connected between output 315 and 343, thus biasing 343 of the microcontroller comparator low for a fixed period of time, which is relative to the ignition cycle time to keep the comparator output in a known state during the period of time the ignition spark is being generated at the coil output.

Resistor 348 is connected between the comparator output 347, and the non-inverting comparator input 345 for positive feedback, known as providing hysteresis. By using a small amount of hysteresis the comparator input sensitivity is kept quite low, but noise immunity would not be adequate with the hysteresis resistor alone, so by providing the 25 percent inhibit signal to the comparator input noise immunity is greatly improved. The inhibit signal is limited to a 25 percent duty cycle signal to allow the engine to accelerate at very high rates without inhibiting the real mag-input signal. This inhibit signal is also limited to a maximum time of 16-ms, which is used at start up before the 25 percent period has been calculated.

The inhibit signal is also connected from 315 to the gate of the Smart-FET tach-output transistor 312. The tach-output signal 350 is provided by a pull-up resistor connected between the battery-input voltage at cathode of diode 352 and a resistor 354, connected to the drain of transistor 312 and to the tach-output terminal 350. By driving the tach-output transistor 312 with the 25 percent duty cycle inhibit signal, the tach-output 350 is always a known 25 percent duty-cycle output, which will be compatible with most tachometers and other RPM input detecting devices used in vehicles for actuating RPM activated switches and data acquisition computers. In contrast to prior art, the tach-output 350 is often taken from the coil-terminal which is very noisy, limited duty cycle, and is very difficult to debounce in the tachometer at high engine speeds. Also, by using a Smart-FET 312, such as a VNK5N07, protection is received from electrical transients and shorts to the battery potential.

The resistor 356 is a current limiting resistor connected between the microcontroller 302 output 315 and the gate of transistor 312, which limits the drive currents sourced and sunk by the microcontroller output and also limits the switching speed of the transistor 312 to limit the dv/dt created by the transistor 312 switching on and off.

The coil drive output 358 is controlled by the microcontroller 302. The current limit comparator 305 in the microcontroller 302 or separate voltage comparator as in the embodiment of FIG. 3b, is responsible for controlling the drive current to a preselected value by controlling the input of the driver 310. The comparator output 311 is connected to the driver 310. The output of the driver 310 is connected to a current limiting resistor 360, which is connected via gate input resistor to each of the IGBT gates via resistors 362 and 364. The node of the resistor 360 and the network resistors 362 and 364 are connected to the collector of transistor 366, a NPN bipolar signal transistor that is controlled by the microcontroller output 313. Output 313 of the microcontroller 302 is an open drain transistor that can only sink current.

Resistor 364 is a pull up resistor between the +5 volt supply and the base of the transistor 366. When 311 goes high, it turns on the driver 310, which causes the output to bias the IGBT gates on. When the gates are biased on the coil, current flows from the battery through the ignition coil primary, then through the IGBTs 306 and 308 (from collector to emitter), and, finally, through resistors 368 and 370 to ground. The coil current continues to flow with the IGBTs 306 and 308 fully enhanced providing a very low voltage drop across the collector to emitter terminals. Typically the on state forward voltage drop across then IGBTs 306 and 308 are less than 1.6 volts at 18–20 amperes of coil current.

When the coil current reaches the full current level that is sensed by 321 at the comparator input and is equal to the reference voltage at the other comparator input 323, the comparator output 311 will go low removing drive signal from the driver 310. This results in the voltage at the gates of the IGBTs 306 and 308 to start decreasing until which time the gate drive threshold is reached which then begins decreasing the current conduction of the IGBTs 306 and 308. When the current conduction decreases to the level sensed by the comparator 305, by providing less voltage drop across the resistors 368 and 370, the comparator 305 at output 311 goes high turning the bias back on to the driver 310 and thus providing bias to the gates of IGBTs 306 and 308. The bias level at the gates of IGBTs 306 and 308 achieve a steady bias level, due to the switching action of the voltage comparator and driver, from current feedback, to keep the coil current at the preselected coil current level, as set by the output current limit reference from the DAC 307 or filtered PWM voltage reference at output 325 of the microcontroller 302 connected to the comparator input 323, via resistor 372, and divided by resistor 374 and 372. The coil is operated in constant current mode until the ignition-timing signal is sensed from the mag-pickup at the zero crossing of the mag-input signal 322.

The driver 310 is a very high-speed device and must be for proper current feedback-constant current operation of the ignition coil current. The response time from when the coil current is sensed to be equal to the current limit reference value and the time to remove bias from the gates of the IGBTs 306 and 308 is critical in providing a stable low ripple constant current operation of a low inductance primary ignition coil. The speed of this feedback loop must be responsive to enable the gates of the IGBTs 306 and 308 to be switched on/off at less than 100 nanoseconds for maintaining low ripple-constant current coil operation. The gate bias voltage is a steady state dc voltage across the gate to emitter terminals of IGBTs 306 and 308. This is because of the RC filtering of the switched voltage from the driver 310 by the gate resistors 362 and 364 and 360 and the gate capacitors 376 and 378, which are connected between the IGBT gate and emitter terminals.

Capacitor 380 is connected to the comparator input and resistor 382 in order to limit the maximum dv/dt at the comparator-input 321 to less than 1 volt/microsecond for stable operation of the comparator over the operating temperature range of the microcontroller. The capacitor 380 is not required when using a separate voltage comparator as in the embodiment of FIG. 3b. Schottky diode 384 is connected to input 321 of the microcontroller and ground provides protection and shunts any negative currents around the microcontroller output 311.

When the zero crossing signal is detected, to interrupt coil current and generate an output spark, the microcontroller output 313 goes high, which allows resistor network 364 at the base of transistor 366 to bias transistor 366 to on, which then clamps the gate of the IGBTs 306 and 308 via gate resistor network 362 to ground, biasing the IGBTs 306 and 308 at an non-conductive state, interrupting coil primary current to generate a high potential voltage at the secondary for spark plug current delivered by the distributor. Output 313 will stay high keeping the IGBTs off until which time the microcontroller 302 has determined the delay time from the coil turnoff until the coil turn-on has elapsed, as controlled by the dwell control algorithm within the microcontroller 302. When the microcontroller 302 is ready to turn coil current on, output 313 goes low removing bias from the base of transistor 366, which allows the driver 310 to provide bias voltage to the IGBT gate terminals, rendering the IGBTs 306 and 308 conductive.

The driver 310 is supplied by a voltage, in this example, 7.5 volts, from a zener diode clamped supply or an NPN pass transistor regulator as in the embodiment of FIG. 3b. Resistor 386 is connected to the battery potential via diode 352 and filter 388. Resistor 386 limits the zener current and power dissipation of zener diode 318 to a safe level under all input battery voltages. In the embodiment of FIG. 3b, the lower impedance of the NPN pass transistor allows lower battery input voltage operation than the resistor 386 impedance allows and is the preferred method. The maximum battery voltage that is delivered to the diode 352 is clamped by surge suppressor diode 320, a part such as a 6KA24 rated at 6000 W peak dissipation. The voltage across diode 320 is typically limited to near 32 volts, which limits the maximum diode 318 zener current and the maximum diode 390 zener current, clamping the input to the low drop out voltage regulator 316 to near 24 volts. In the embodiment of FIG. 3b, the low drop out regulator input is limited to about 7.5 volts by the NPN pass transistor. The voltage supply for driver 310 is selected for providing a IGBT gate drive voltage of about 6.8 volts which insures full saturation of the IGBT transistors 306 and 308 before the voltage is reduced for current limit operation. A higher voltage than 6.8 volts, causes excessively long current control loop times, which causes higher ripple current in the coil primary during current limited coil operation.

The resistor 360 limits the maximum current sourced and sunk by the driver 310 to less than 18 milliamps, and limits also the maximum current that transistor 366 must sink when the IGBTs gates are clamped for coil turnoff. The LDO voltage regulator 316 is supplied battery voltage via resistor 391, which limits the maximum zener diode current of input zener 390 to about 24 volts. The battery voltage is filtered by capacitor 392 at the input of regulator 316 and the +5 volt output of regulator 316 is filtered by capacitors 394 and 396. It is also filtered by capacitors 398, 400, and 402 that are connected to supply power to the microcontroller 302.

The +5 volt supply is also connected to resistor network 364, which is also connected to input 331 of the microcontroller, which provides a master clear function. The power supply is sensed at input 331 and causes a reset state at power on until the voltage of the +5 volt supply rises greater than the reset voltage threshold, which is typically about 2.8 volts. Also, the microcontroller 302 has brownout detect reset that causes a reset state if the +5 volt supply drops to less than 4.5 volts typically. In the embodiment of FIG. 3b, using the PIC18F1320, only the Brownout detect reset and power-on reset are used for better noise immunity. Using the LDO voltage regulator 316, the ignition microcontroller 302 will operate to about 5.6 volts battery potential input.

The clock for the microcontroller 302 includes a 16 mhz resonator 304 that is connected to the microcontroller 302. An internal oscillator buffer drives the resonator 304 to produce the 16 mhz clock used internal of the microcontroller 302. In the embodiment of FIG. 3b, the clock is derived from an 8 MHz resonator and uses 4X PLL for an internal clock speed of 32 MHz with the PIC18F1320 giving better speed measurements and dwell control.

Input 333 of the microcontroller 302 is an analog input that is connected to a user accessible potentiometer 314, that can be adjusted to provide a voltage of 0 to 5 volts input used to set the maximum revlimit value for revlimiting the engine speed. The analog-to-digital converter 353 reads the potentiometer voltage when needed and 768-microseconds after the coil current turn on if current limit is not active.

The analog-to-digital converter 353 is not read immediately after the spark and it is not read during a current limit period. At power up, the analog-to-digital 353 is read and is completed in 64-ms at power on. The analog-to-digital value is sampled for 32 times and averaged for the final revlimit value, which is then converted to an RPM value that is used in comparison to the measured engine speed each ignition cycle. The potentiometer 314 is only read one time each ignition cycle.

The main program loop time is about 24 microseconds and this is the loop time used in the trail edge debounce routine. This method of acquiring the revlimit potentiometer value allows good resolution of about 8-RPM per analog-to-digital count with a range of 2000 to 10,000 RPM. The microcontroller internal timer may be the limiting factor for measuring the engine speed and results in higher resolution at the lowest revlimit speed. At 2000 RPM the timer resolution is about +/−1 RPM and at 10,000 RPM the timer resolution is about +/−13 RPM, with a timer period of 2-microseconds per count.

The revlimiter functions by measuring the engine speed and then comparing the present RPM to the averaged revlimit value that was previously saved. When the microcontroller 302 has detected the present engine speed is greater than the revlimit value, a Revlimit flag is set to one. When the next coil delay time is completed and has caused an interrupt, the Revlimit flag is tested, and if it is set the ignition coil will not be turned on, resulting in no stored energy and no output spark for the present ignition cycle/cylinder. As the engine misfires, due to no spark being generated, the engine speed will slow until the engine speed is measured to be below the revlimit value at which time the coil Revlimit flag will be cleared and allow coil current for succeeding ignition cycles. This type of revlimiter action does not require the coil energy to be prolonged in current limit so no excess dwell occurs during revlimit operation, and also no clamping is required to limit the secondary voltage to some lower value to keep the spark voltage suppressed below the spark plug breakdown voltage level, as has been done in prior art. This revlimiting method is very efficient in that the normal dwell and excess dwell is in use up to the time that the engine speed is detected to be greater than the revlimit value, which then allows the coil turnoff at the correct ignition timing and then prevents coil energy from being stored for the next ignition cycle to effect a misfire and therefore revlimit the engine, thus controlling engine over-speed.

The present invention has means, which are implemented, in hardware and in firmware algorithms to detect when a traction control device is effecting the ignition timing. The method of controlling traction by prior art is to alter the ignition timing to retard the ignition spark, which effectively reduces torque and horsepower output to keep the vehicle under control when the tires begin a predetermined rate of acceleration. The traction control device can be connected by several means to effect ignition timing. The first traction control connection is when the device is connected to the tach-terminal, which is the coil-terminal also. By connecting to the coil-terminal, the traction control device can then prolong the coil dwell to effect ignition timing retard. Under normal conditions the ignition coil would turn-off when the mag-input signal rises through zero crossing causing an output spark. With a traction control device connected to the coil-terminal, the device can override the coil turnoff by providing a parallel conduction path for ignition coil primary current flow, which then allows current to flow longer, which retards the ignition timing as well as causes excess dwell time and increased power dissipation in the ignition coil.

A traction control device connected to the coil-terminal may be detected by using a zener diode 404, with the cathode of the diode 404 connected to the coil-terminal. The anode of the diode 404 is connected to resistor 406 that is also connected to the base of NPN transistor 408. Another resistor 410 is also connected to the base of transistor 408 and to ground. The collector terminal of transistor 408 is connected to a digital input of the microcontroller 302, and to a pull up resistor 412 to +5 volts.

The detection circuit functions to detect the coil-terminal voltage level, which rises above the zener reverse breakdown voltage of about 124–200 volts, when the coil current is interrupted. The microcontroller may be in an interrupt routine still processing the lead edge or ignition timing edge of the input signal when the coil current is interrupted. During the lead edge interrupt an input 403 to the microcontroller 302 is polled several times during the first 10–30 microseconds after the coil current was interrupted, to look for the signal going low which indicates that coil voltage has been detected and thus a spark generated. If the low signal is not detected during the 10–30 microsecond time period following coil turnoff, a traction control device has been detected because the normal coil rise time is such that the primary voltage will always rise and be detected within 10–30-microseconds from coil turnoff. When a traction control device is detected, a flag is set which puts the ignition into a studder mode of operation. The studder mode will cause the ignition output to be alternately placed in revlimit for a number of cycles and allow output sparks for a number of cycles to indicate the use of the traction control device and to interfere with the operation of the ignition and traction control device operation. When the ignition is operating in a revlimit mode, such as indicted by testing the Revlimit flag, the studder mode is inhibited.

An alternate approach of detecting a traction control device effecting the ignition timing is by the microcontroller 302 measuring the duty cycle ratio change of the mag-input signal for changes that are abnormal to normal ignition operation. The normal mag-input duty cycle is such that the percentage of time the mag-input signal is high and percentage of time this signal is low is very constant at higher operating engine speeds above 4000-RPM. By the microcontroller 302 measuring the high time and the low time periods of the mag-input signal, these time periods are then averaged and used for comparisons for changes in the instantaneous duty cycle that indicate a traction control device has been connected to the mag-input for effecting ignition timing to cause retarded ignition timing. When the mag-input duty cycle is detected to be changing above a specific threshold, the studder mode flag is set indicating a traction control device has been detected. The ignition is likewise operated in the studder mode for a number of cycles to interfere with ignition and traction control device operation.

Yet another detection method can be implemented by measuring the high time of the mag-input signal, which is averaged over a number of ignition cycles and then compared to the instantaneous high time of the mag-input signal, which will indicate a traction control device is actively effecting ignition timing when the comparison results in a difference above a specific threshold of time difference. When the mag-input high time compared time difference is detected to be above the specified threshold value, which is at a rate that is greater than a normal acceleration/deceleration rate, the studder mode flag is set, indicating a traction control device has been detected. The ignition is likewise operated in the studder mode for a number of cycles to interfere with ignition and traction control device operation.

The traction control detection means could be implemented in several ways by detecting percentage changes to the ignition period time, the mag-input signal high duty cycle only in degrees or timer counts and the average duty cycle or time value could be taken on more or less ignition cycles also. Above 4000 RPM the typical engine speed rate of acceleration does not change by more than several percent per ignition period, so that a traction device detection threshold of a period change of more than +/10 percent could be used to indicate a traction control device is actively effecting ignition timing. A 10 percent change would therefore indicate a timing change of 9 degrees, for an 8-cylinder engine. The actual detect threshold could be chosen for any value but a value of 5–12 percent is desired for the preferred embodiment. If the traction control effectively generates retarded timing to effect traction control, the timing retard value is usually more than 10 degrees of retard, which is easily detected with any of the algorithms presented and could be implemented separately or together as multiple detection means as well as using mag-input and coil output means for traction control detection and output studder mode control. Another method of traction control detection is used in the embodiment of FIG. 3b, which detects rapid changes in the mag-pickup signal amplitude. The traction control device will load the mag-signal causing an attenuation of greater than 50 percent of the normal mag-pickup amplitude. A tracking filter and voltage comparator send a signal to the microcontroller when the traction control has been detected and only during engine acceleration does the microcontroller test this input to test a TCD flag.

The present invention maintains full energy storage for every spark even if one spark plug is failing to fire or has a large breakdown voltage resulting in an imbalance of energy delivered between cylinders. Coil energy is maintained on a cylinder-by-cylinder basis by measuring the coil primary current rise time to reach current limit and the time in current limit before the coil current is turned off to generate a spark. The current dwell time for each cylinder is thus controlled for the correct amount of energy to be stored, delivered and the residual energy left over in the coil.

Figure 9:
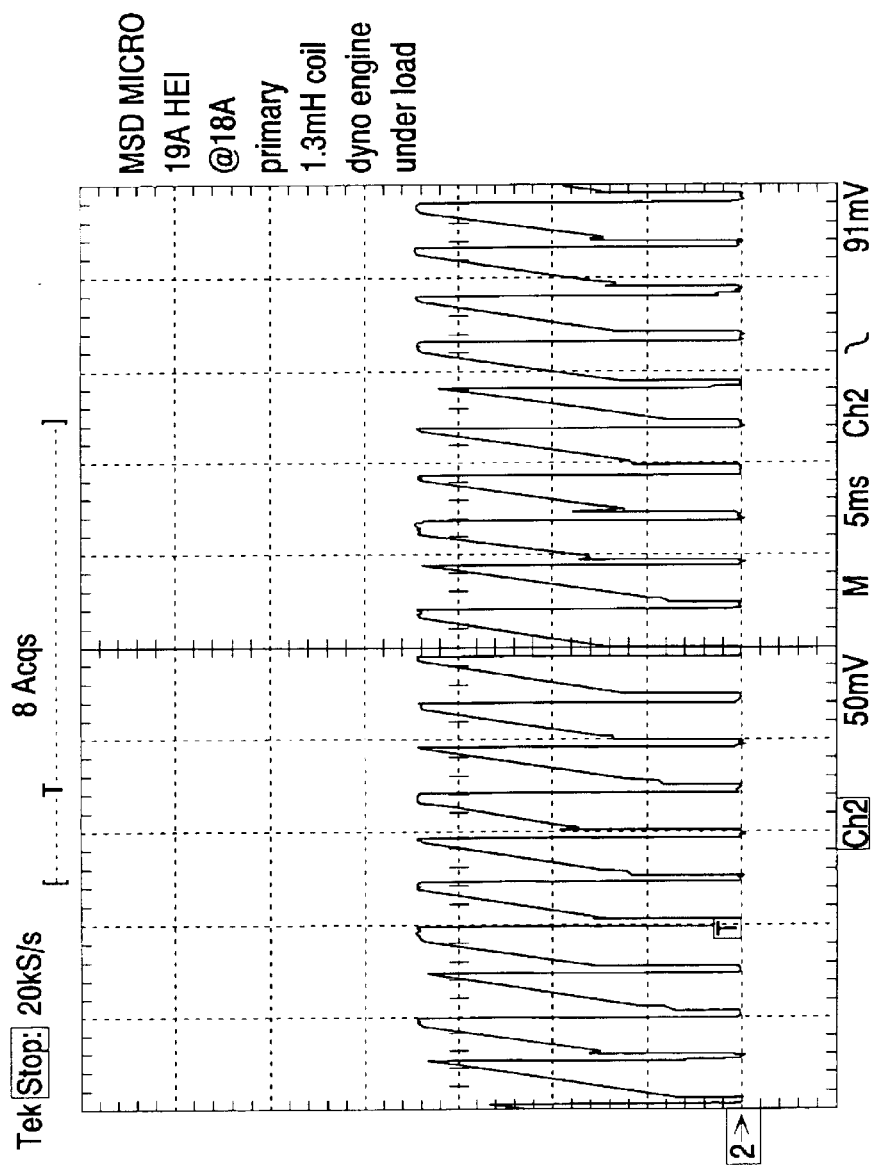
FIG. 9 is a graph of the ignition operating at 6000 RPM with full primary current in accordance with one embodiment of the present invention.

With typical coil-primary current rise times of 2 to 2.5-ms, at high speed the coil typically has residual energy stored from one cycle to the next. Referring to FIG. 9, the ignition is shown under full load. The current dwell time is maintained at from 90 to 100 percent of the full primary current value for each cylinder while managing the excess dwell time.

Figure 10:
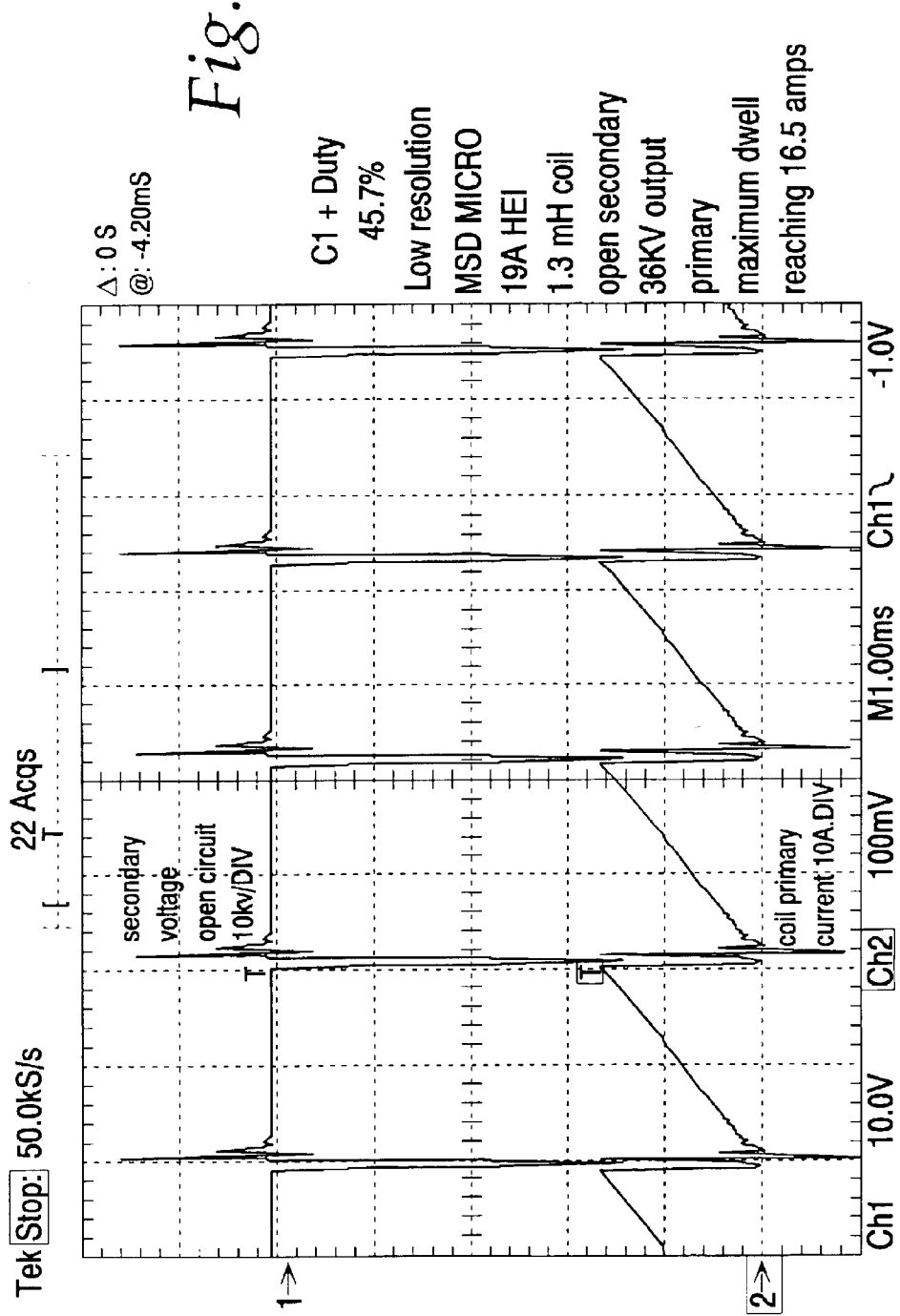
FIG. 10 is a graph showing open secondary voltage and primary current at 6800 RPM in accordance with one embodiment of the present invention.

If the coil energy is completely delivered in an ignition cycle, the coil will not be able to be completely recharged to full energy in the next cycle at high-speed operation. Referring to FIG. 10, the ignition is shown operating with an open secondary coil. Operating in this manner results in lower primary coil current at minimum off time and minimum dwell time. This then limits the total stored energy for a given inductance and a given maximum coil dwell on time. This energy is maintained to the desired level in this ignition by allowing very high duty cycle operation at high engine speeds by setting the minimum coil off time to a very low value that is limited to 75 microseconds if needed, when the ignition period is less than 2-ms or above 7500 RPM for an 8 cylinder engine.

Figure 11:
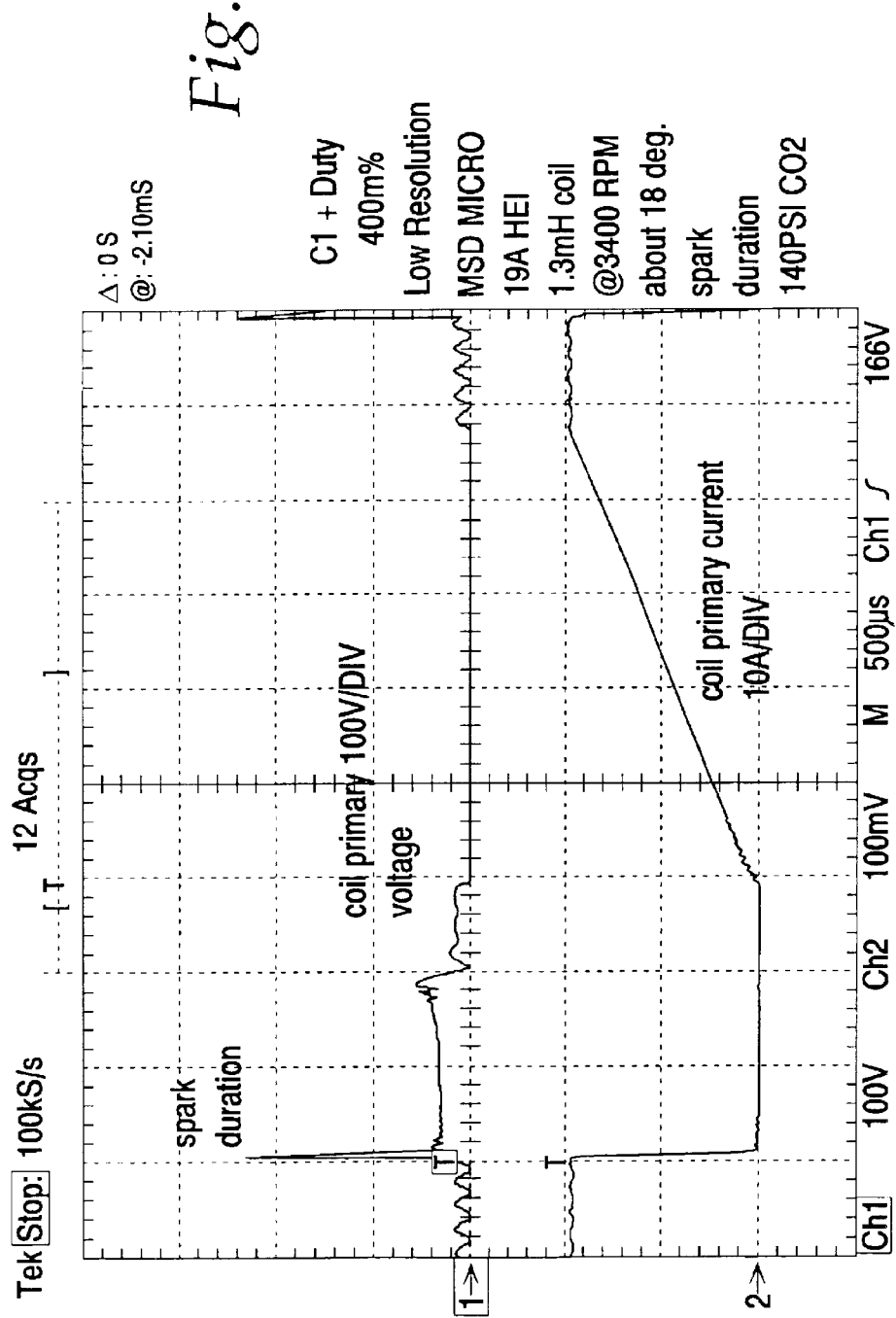
FIG. 11 is a graph of the primary coil reaching full current in accordance with one embodiment of the present invention.

The coil dwell time is maintained to achieve full current for a minimum preset time before coil turn-off. The time that the coil is held at full current limit is specific to the RPM range of the engine. The current limited time is longer at low speed operation than at high-speed operation to allow for engine accelerations over 6000 RPM/second while still maintaining full energy storage under engine acceleration. Referring now to FIG. 11, the ignition is shown operating at 3400 RPM with full primary coil current of 19 amps and an output spark of 18 degrees or 800 microseconds duration. The excess dwell time is 12 percent.

The current limit time is adjusted to maintain the smallest possible steady current limited dwell time, while achieving full current for an cylinder periods. When the coil current does not reach full current, the current limit dwell time is increased in fixed increments of the total ignition period. This allows the best compromise between minimum power dissipation while in current limit and best coil dwell on time to insure every cylinder can reach full current and thus energy storage.

Referring now to FIG. 4, one example of adjusting dwell control parameters during the initial period after power-up is described. As will be discussed below, the present approach determines rules based upon the speed of the engine. However, it will be realized that the exact values and ranges discussed below may vary and that the invention is in no way limited to these specific speed ranges. In addition, the rules themselves are given as examples only and may change, based upon among other things, the type of engine used and the operating environment of the engine.

At step 451, the speed and/or mode of operation is determined. In one example, the speed may be determined by the use of a mag-input sensor. The speed may also be used to determine the mode of operation of the engine. For instance, if the speed is less than 235 RPM, the mode of operation is cranking mode.

At step 452, power up of the system is accomplished. A microcontroller initializes the system before coil current is turned on. In one example, this start up process takes approximately 64-ms to complete. During this process, the mag-input is processed to determine speed and the edges of the mag-input are debounced.

The power-on process initializes the hardware components of the system. In one example, the default debounce of the mag-input trail edge is 96-microseconds at power on, since no spark is being generated, and the engine speed may not be cranking speed, the highest speed range value for trail edge debounce is used at power on. After the start-up time period (e.g., 64 ms) has elapsed the coil primary current is activated, for instance, by setting a flag. The ramp time is set to initialize at 1-ms and is allowed to ramp up to 8-ms maximum during operation. During the start-up time period the mag-input interrupts are being processed, the microcontroller measures engine speed and selects the speed range of operation and all of the values associated with the specific speed range before the first dwell period is initiated. Also during the start-up time period, the DAC output value (described with respect to FIG. 3), which sets the current reference for the coil current comparator, is initialized for full coil current. In the embodiment of FIG. 3b, the low pass filter charges from the PWM output over several milliseconds to reach the desired current reference voltage.

At step 454, a mode for cranking engine speeds is entered. In this mode, the coil is not activated until the trigger input edge of the mag-input signal is detected on the positive zero crossing of the input signal, after the start-up time period (e.g., the first 64-ms). The positive zero crossing is when the coil is turned off in normal modes above cranking speed (e.g., above 235 RPM). In cranking mode, the coil is turned on at zero crossing and as soon as the full coil current level is detected by the coil current voltage comparator, the coil is turned off, generating the ignition spark. The coil current comparator is read by the main routine every 24-microseconds. Advantageously, this approach provides precise current control with no long dwell times in contrast to previous systems, which turn the coil on at power-on and dwell for up to a second or more waiting for the ignition trigger to occur.

At step 456, once the engine speed rises above 235 RPM, the ignition enters the next mode. The next coil turn on, after the speed has increased above 235 RPM, is from the trailing edge of the mag-input signal with no dwell time calculation required. After the first trail edge turn on dwell cycle, the microcontroller has calculated the ignition period time and then generates a delay time relative to the mag-input lead edge to turn the coil on for the second cycle for a 45 percent excess dwell period. This is the first dwell-calculated coil on time. The succeeding excess dwell on times are reduced over the next 7 cycles, decreasing at 6 percent of the ignition period per cycle until the excess dwell time of 12 percent of the total ignition period is achieved. The current limit time of 12 percent of the ignition period will be maintained as long as the engine speed remains below 1875 RPM. The 12 percent excess dwell time gives the ignition good response for maintaining full coil stored energy during engine acceleration in this speed range. By using decreasing dwell over a number of ignition cycles at start up is unique in the automotive art and insures that full coil energy is stored at startup when the engine maybe accelerating at over 10,000 RPM/second.

At step 458, the next mode of operation is entered for engine speeds above 1875 RPM up to 3750 RPM. This range controls the excess current dwell time from 12 percent to 6 percent in 3 percent increments. The excess current dwell adjustment begins at the 12 percent value and after 32 consecutive ignition cycles with no under current dwell periods the current limited dwell time is reduced by 3 percent. The microcontroller continues to reduce the excess dwell to the lowest value for this speed range, 6 percent. If two or more coil dwell periods fail to reach the full current limit value in any 8 period sample, the current limit dwell time is increased by +3 percent and maintained until 32 consecutive samples again have achieved the coil current limited value. This process continues trying to reduce the current limited dwell time for lowest power dissipation while striving to achieve full energy storage for every ignition spark as well.

At step 460, the next phase of operation is from 3750 RPM to 5000 RPM is entered. The current limited dwell time is controlled from 9 percent to 3 percent in 3 percent increments. The same rules apply for reducing and increasing the current dwell time in this range as the previous range described with respect to step 458.

At step 462, the next phase of operation is from 5500 RPM to 10,000 RPM is entered. The current limited dwell time is controlled from 6 percent to 3 percent in 3 percent increments. The same rules apply for reducing and increasing the dwell time in this range as the 1875–3750 RPM range described with respect to step 458.

The present invention has multiple rules that are applied to control the dwell control parameters of the ignition coil such as the coil dwell on time and the excess dwell time, which provides dwell time changes over several speed ranges and at differing rates under specific conditions. The minimum coil off times may also be adjusted according to rules relating to the speed range where the engine is operating.

Figure 5A:
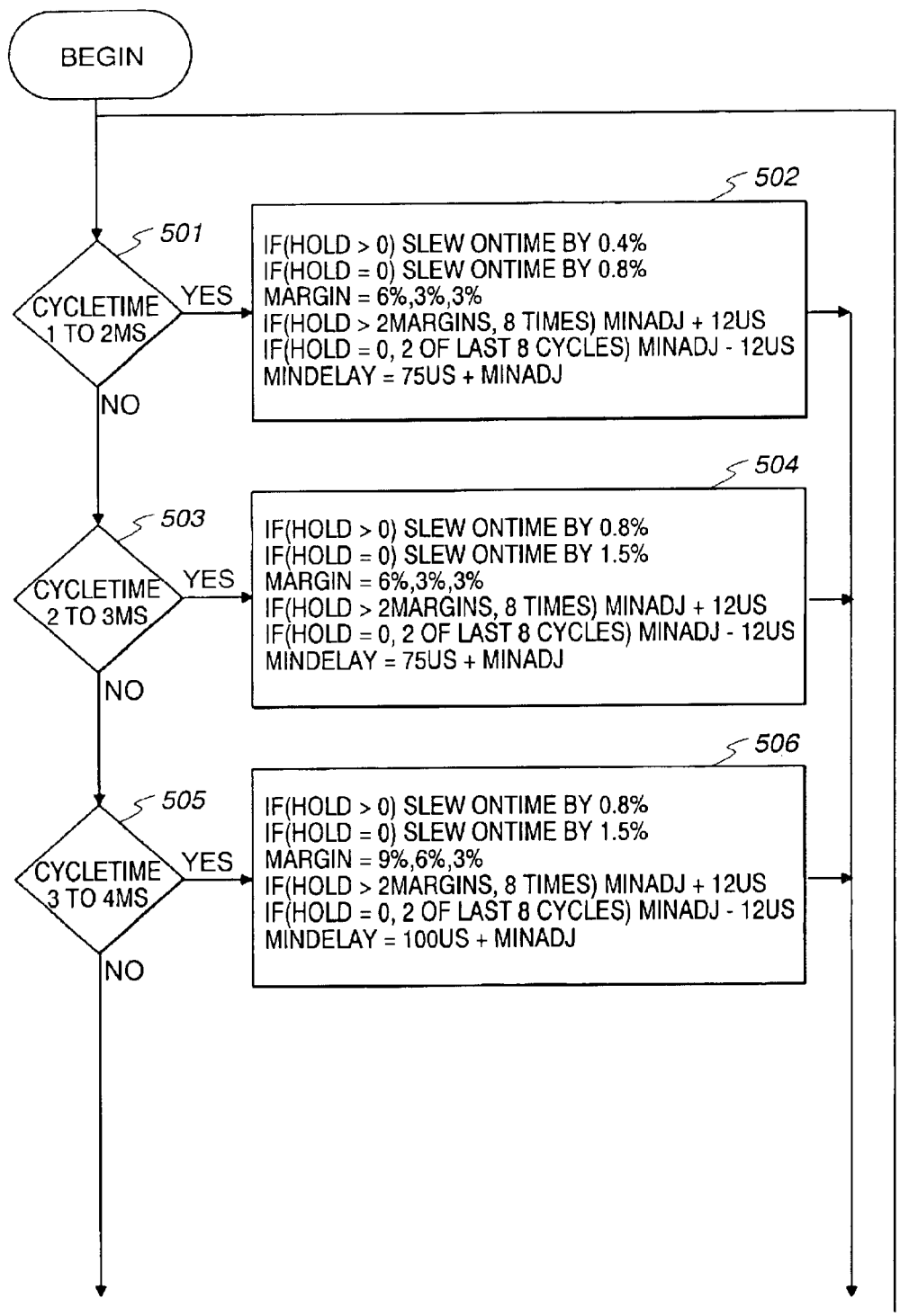
FIG. 5 is a flowchart of the operation of the HEI system in accordance with one embodiment of the present invention.
Figure 5B:
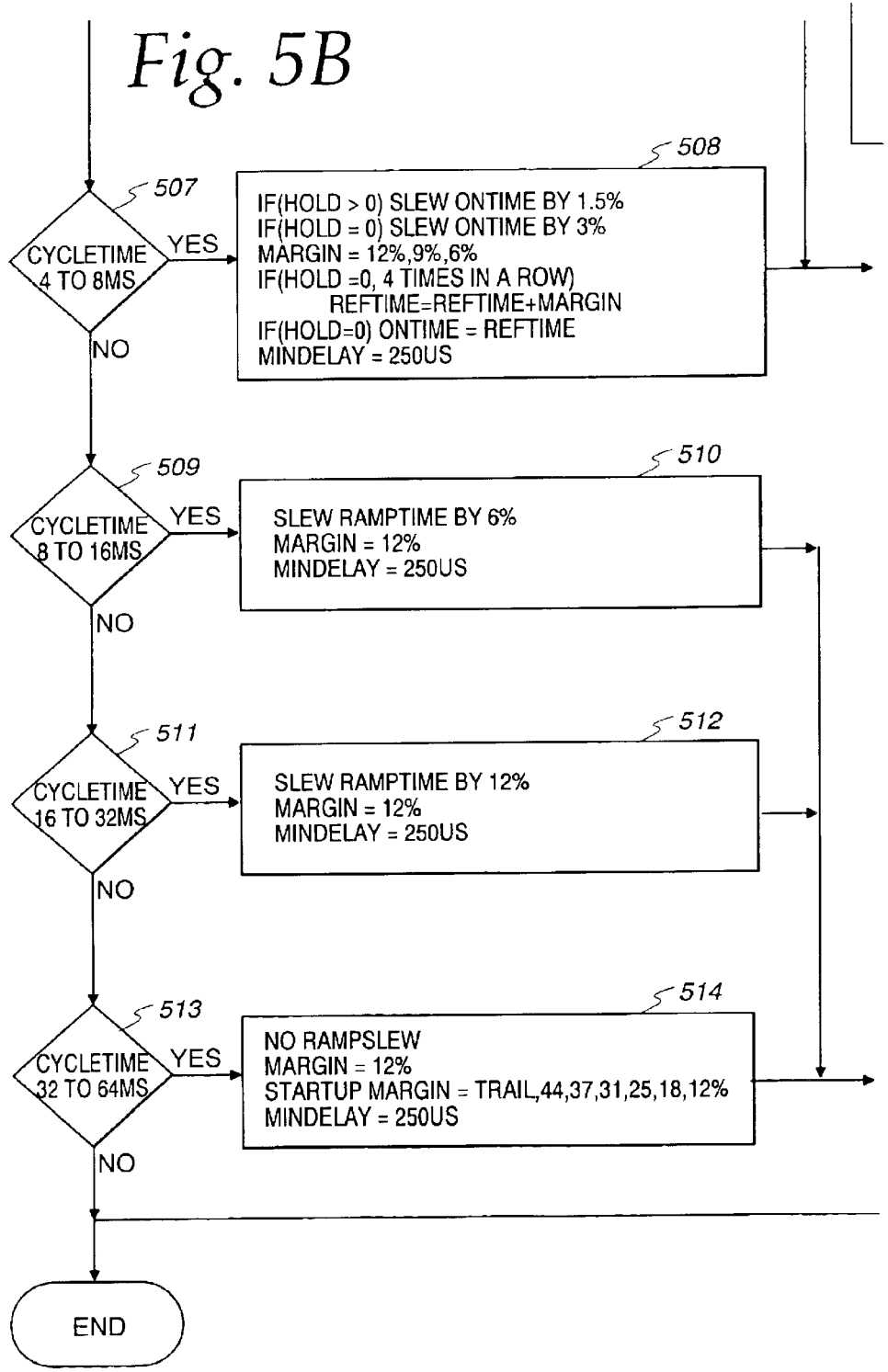
Figure 5C:
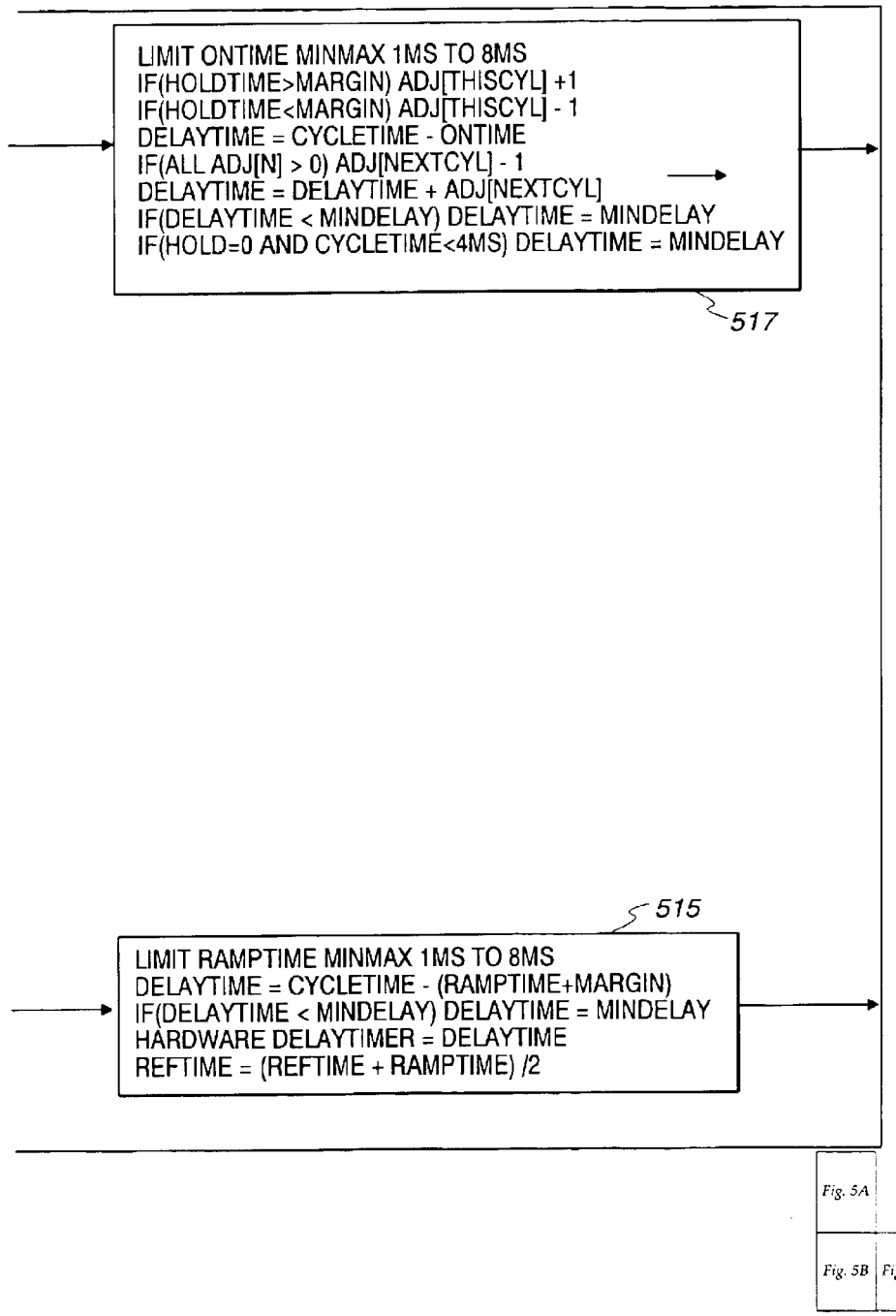

Referring now to FIG. 5, one example of an algorithm that controls various dwell control parameters of the engine is described.

At step 501, it is determined if the cycle time is from 1 to 2 ms. If the answer is negative, then execution continues at step 503. If the answer is affirmative, then at step 502, the engine enters the 1 to 2 ms range. The minimum off time is 75 microseconds for higher speeds. The slew divider value is 256 above 7500 RPM. The margin is 6 percent or 3 percent. In addition when the current hold or excess dwell is not achieved in these speed ranges, the minimum delay for the operating speed range is used for the next cycle to allow quick energy restoration in the faster engine speed range for energy recovery to the normal stored energy level. Using the minimum off-time value when no current limit is sensed is also implemented. The rules for adjusted off time values are also in effect. Control continues at step 517.

At step 517, the ramp time is limited to a minimum of 1 ms and a maximum of 8 ms. An adjust-cylinder matrix, including 8 values, one value for each cylinder, is adjusted. The adjustment varies the delay or off time value for the particular cylinder thereby modifying the coil dwell time for each cylinder. The adjust-cylinder value is a number from 0 to 128. When the coil fails to achieve current limit hold for one margin time, the adjust-cylinder value is decremented. Conversely, if the hold time is greater than one margin the adjust-cylinder time is increased for the present cylinder. The adjust-cylinder times are optimized when only one cylinder has an adjust-cylinder value of zero. A flag is set to indicate the all-cylinder adjust value decrement operation. If all of the adjust-cylinder values are greater than zero, then all of the adjust-cylinder values are decreased by one until at least one of the adjust-cylinder values are zero. The cylinder adjust values are only decremented one count for one cylinder, once per ignition cycle. This prevents a bias windup of the adjust-cylinder values.

The adjust-cylinder values are adjusted one at a time during the following 8 cycles after the decision was made to decease all by one count. This provides individual cylinder adjusted dwell control for managing the optimum dwell time in each cylinder, thereby providing energy management for each cylinder. There is a minimum fixed off time, which is 75 microseconds in this range. Each range has a fixed minimum off time, but in this speed range and faster speeds the fixed off time is increased by the adjusted-off-time. This enables the ignition to provide a longer dwell time for the next cycle if the current hold was not detected without an excessively long dwell time for the next cycle. After step 517 is complete, execution ends.

At step 503, it is determined if the cycle time is from 2 to 3 ms. If the answer is negative, then control continues with step 505. If the answer is affirmative, then at step 504, the engine enters the 2 to 3 ms range. The minimum off time is 75 microseconds for higher speeds. The margin for the 5000 to 7000 RPM or 2–3 ms range is 6 percent to 3 percent. In addition, when the current hold or excess dwell is not achieved in these speed ranges, the minimum delay for the operating speed range is used for the next cycle to allow quick energy restoration in the faster engine speed range for energy recovery to the normal stored energy level. Using the minimum off-time value when no current limit is sensed is only implemented for operating at speeds higher than 3750 RPM.

In addition, the adjusted-off-time value is increased or deceased from 0–64 counts, and each count is 12-microseconds long. The adjust-off-time delay value is increased by one count when 8 double margins have been detected. The 8 count is reset if the speed is slower than 1875 RPM or 8 ms period, or if no current hold is detected. If two consecutive cycles of no current hold are detected, the adjusted-off-time value is decreased by one count. The margin value is initialized at the largest value for this speed range of 12 percent. The margin can decrease under steady conditions to conserve power and limit dissipation. When the current hold value has been detected for 32 consecutive ignition cycles, the margin is decreased by 3 percent. This will continue to the lowest margin for this range, 6 percent. If two or more current holds are not detected in the last 8 ignition cycles, the margin will be increased by +3 percent, and will continue up to the largest margin value if necessary for this speed range. This function allows the ignition to maintain the lowest time in current limit that gives long term stability, but will always optimize the margin and thus dwell time to insure full energy storage for every spark as a priority and low power dissipation secondarily. Control continues at step 517 as described above.

At step 505, it is determined if the cycle time is from 3 to 4 ms. If the answer is negative, then control continues with step 507. If the answer is affirmative, then at step 506, the speed range above 3750 RPM or 3–4 ms is entered. Only the values of the slew, margin, and minimum off times are changed. The minimum off time is 100 microseconds for 3750 to 5000 RPM or 34 ms, and 75 microseconds for higher speeds. The slew divider value is 128 from 3750 to 7500 RPM and a slew divider value of 256 above 7500 RPM. The margin for the 3750 to 5000 RPM or 3–4 ms range is 9 percent to 3 percent, and above 5000 RPM or 3 ms range is 6 percent or 3 percent. In addition when the current hold or excess dwell is not achieved in these speed ranges, the minimum delay for the operating speed range is used for the next cycle to allow quick energy restoration in the faster engine speed range for energy recovery to the normal stored energy level. Control continues at step 517 as described above.

Using the minimum off-time value when no current limit is sensed is only implemented for operating at speeds higher than 3750 RPM. At high-speed operation the ignition coil retains some residual energy from cycle to cycle which is part of the total energy stored each ignition cycle. When a spark plug fails to fire or misfires causing the residual energy to be depleted, the dwell time must therefore increase by a substantial amount for the next cycle or the coil will not be restored to full energy the next cycle. By sensing the coil did not reach full current limit and then commanding the off time for the next cycle be operated at the minimum specified value, the predetermined energy is quickly restored in one or two ignition cycles during high speed operation, thus succeeding in energy management where prior systems have performed poorly.

At step 507, it is determined if the cycle time is from 4 to 8 ms. If the answer is negative, then control continues with step 509. If the answer is affirmative, then at step 508, the next speed range of 1875–3750 or 4–8 ms ignition period, dwell control is determined using different rules. The slew divider is now applied to adjusting the coil dwell on time rather than the ramp time. The coil on time is the total time the coil is turned on, which are the ramp time and the current limited or excess dwell time. Using the on time for slewing the on time results in smaller changes in the slewed on time with a slew divider of 64.

One of the rules for this speed range is the ability to double the slew rate value when the coil current does not reach the current limit, which increases the next cycle dwell time by slewing the on time value at two times the normal slew value. In addition, when no hold current is detected the slewed on time value is replaced with the reference ramp value on the next ignition cycle.

In this speed range, the new on time is continually slewed up or down to maintain the current hold time to one margin which begins at a value of 12 percent and can be changed to as low as 6 percent in 3 percent increments. The reference ramp time is continually updated from the last measured value up to 8-ms maximum value. The reference ramp time is incremented by +1 margin and is never decremented. The need to increase the reference ramp time could be due to low battery operation or increasing temperature of the coil causing an increase in primary resistance. By using the reference ramp time when the coil fails to reach full current limit, the next cycle is insured to have full current and not have to wait for the slower change of on time from the slewing of the on time value. When the speed is slower than 1875 RPM (or an 8 ms period), the reference ramp time is constantly saved, for example, in a memory.

At step 509, it is determined if the cycle time is from 8 to 16 ms. If the answer is negative, then control continues with step 511. If the answer is affirmative, then at step 510, the 8–16 ms ignition period range is entered and the ramp time is slewed by 6 percent, with a slew divider value of 16 and the margin 5 is 12 percent. In this speed range, the ramp time is measured from the lower speed range and is now stewed up or down continuously during each ignition period by use of a slew divider value specific to the current speed range. The ramp time is stewed to maintain a current limit hold time of one margin. Control then continues at step 515.

At step 515, the ramp time is limited to a minimum of 1 ms and a maximum of 8 ms. The delay time is set equal to the cycle time minus the ramp time and the margin. If it is determined that the delay time is less than the minimum delay, then the delay time is set to the minimum delay. After step 515 is complete, execution ends.

At step 511, it is determined if the cycle time is from 16 to 32 ms. If the answer is negative, then control continues with step 513. If the answer is affirmative, then at step 512, the speed range of 468 to 937 RPM or 1632 ms is entered. In this speed range, the ramp time is measured from the lower speed range and is now stewed up or down continuously during each ignition period by use of a slew divider value specific to the current speed range. The ramp time is stewed to maintain a current limit hold time of one margin.

In the 32 to 16 ms ignition period range, the slew divider is a value of 8. This provides a slew value of 12 percent, which is used to adjust the dwell time, to increment or decrement the stewed ramp time for the next ignition cycle for maintaining an excess dwell time equal to one margin value of 12 percent of the ignition period for this operating speed range. This allows the ramp time to be corrected at a fast rate in this speed range but with good resolution.

As the speed of the engine increases the slew divider is increased to provide finer resolution of the slewed ramp value to effectively maintain a near constant slew rate of the ramp time value. The ramp time is only stewed below 1875 RPM for the dwell change, above this speed the on time is slewed for dwell time changes. This approach gives good response to rapid engine acceleration as the ignition period is shrinking while maintaining full stored energy. The margin for this speed range, 16–32 ms, is 12 percent of the ignition period time and the slew ramp time is at a 12 percent rate. If the coil fails to reach the full current limit value, only the slewing of the slewed ramp time compensates to turn the coil on longer for the next cycle. This type of dwell control in this speed range is of long term in that the slew rate is limited to a fixed rate and may take several cycles to reach an optimum coil dwell time of achieving the coil current limit time of one margin. During this speed range the ramp time is saved as the reference ramp value, which will be used when the engine enters the 4–8 ms-speed range. There is a minimum fixed off time, which is 250 microseconds in this range, which is not adjustable. The system then executes step 515 as described above.

At step 513, it is determined if the cycle time is from 32 to 64 ms. If the answer is negative, then control ends. If the answer is affirmative, then at step 514, the slowest dwell controlled range, from 235–468 RPM or an ignition period of 32–64 ms, is entered and the coil current ramp time to full current controls the excess coil dwell on time. The ramp time is added with a fixed 12 percent excess dwell time, which is then subtracted from the ignition period time to generate the delay time for the next ignition period. There is a minimum fixed off time of 250 microseconds in this range. There is no ramp slew in this speed range. Control then continues with step 515 as described above.

The margin time (target) is preferably defined to be a percentage of the ignition period time. If the coil current fails to reach the full current limit value at the trigger time to turn the coil off, the coil is immediately turned back on until full current is reached then turns off to produce the output spark. This ensures that the cylinder does get full energy with a small retard of the ignition spark. Since the coil was immediately reactivated, nearly all of the energy previously stored is still in the coil and therefore requires as little as a fraction of the normal ramp time to fire the coil at full current.

In one example, for a 2 ms-rise coil, if the coil failed to turn on at all, due to a very rapid acceleration in this speed range, the maximum timing retard from a 2 ms delay would be 4.8 degrees at 400 RPM. The delay value or coil off time is thus calculated every ignition period for the next period based on the ramp time, margin, and ignition period time. This speed range stores full energy in the coil with about 12 percent of the ignition period in current limit to allow for full current at high rates of acceleration, while maintaining a good balance between energy stored and power dissipated.

As has been described previously, the revlimited operation mode can be set to revlimit, which prohibits any output sparks when the preset revlimit potentiometer value is exceeded. This mode of operation measures the ignition period, which is converted to an RPM value, to determine when the ignition should inhibit coil drive to inhibit generation of output sparks. Rather than turning the coil on and then leaving it on or having to ramp the coil current down, this ignition determines when the engine speed exceeds the revlimit value and then prevents the next coil turn on cycle, which then causes the engine to misfire to prevent overspeeding. This is very efficient operation of the coil by using all the stored energy for the last spark and not recharging the coil until the engine speed has dropped below the revlimit value. The ignition then turns the coil back on recharging to about 40–90 percent of the full energy value on the first ignition cycle and back to full energy on the second or third spark after the engine speed has dropped below the revlimit RPM value. This gives a very smooth revlimiting action and can be set to within about +/−13 RPM of the user-defined revlimit RPM desired. Another embodiment of this invention allows an affixed revlimiter value to be programmed in the microcontroller at the time of manufacture for a spec-class ignition that is not user adjustable.

Figure 12:
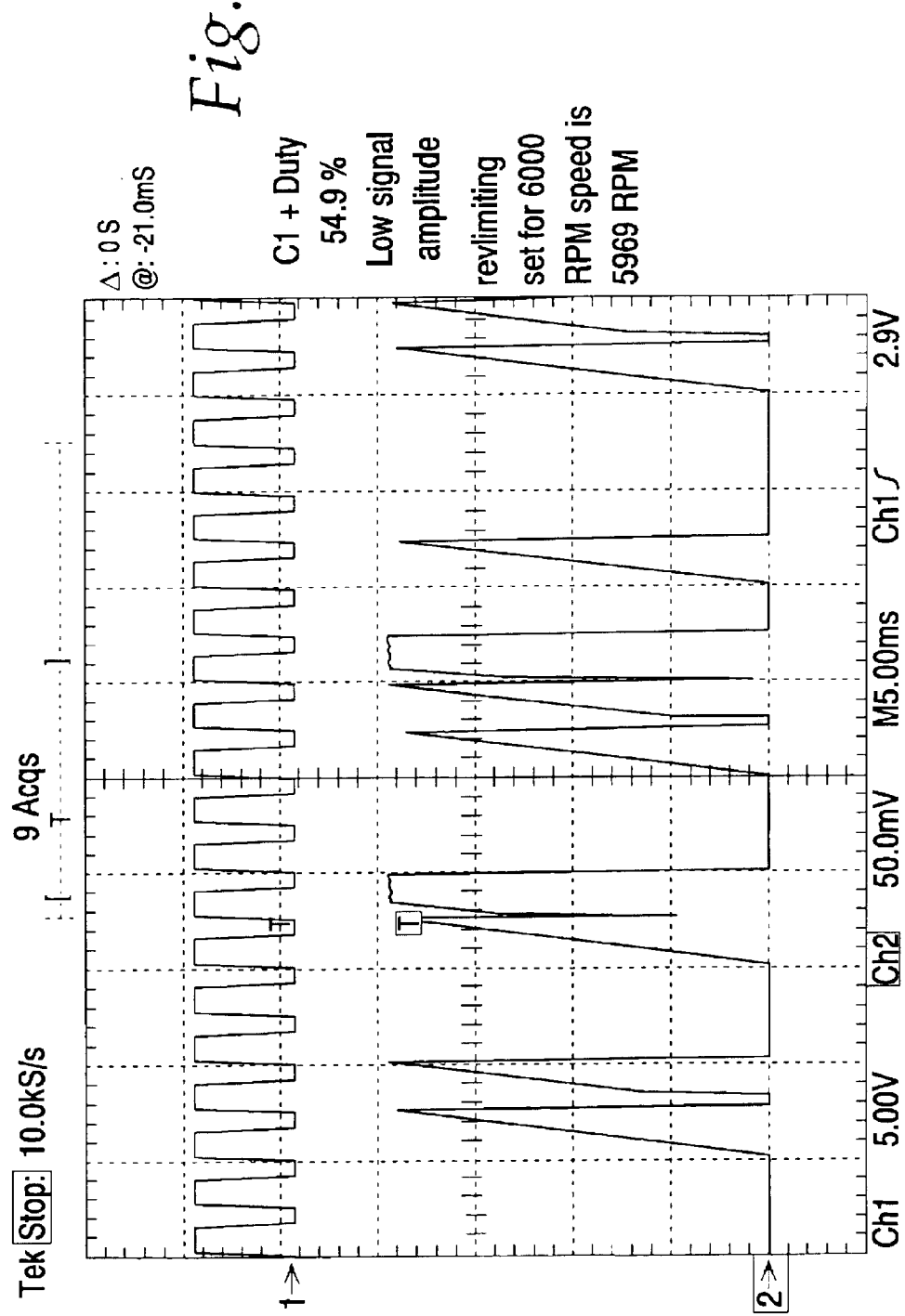
FIG. 12 is a graph of high current ignition with 1.3 mH primary at 19 amps peak primary current in high speed revlimit operation in accordance with one embodiment of the present invention.

FIG. 12 shows the coil primary current when the engine is just in revlimit mode of operation. Each cycle after the coil was turned off to revlimit , the next coil current reached 85 percent or more of the full current level. Also, the second pair and third set of coil current waveforms, the minimum off time was implemented to return full energy.

Figure 13:
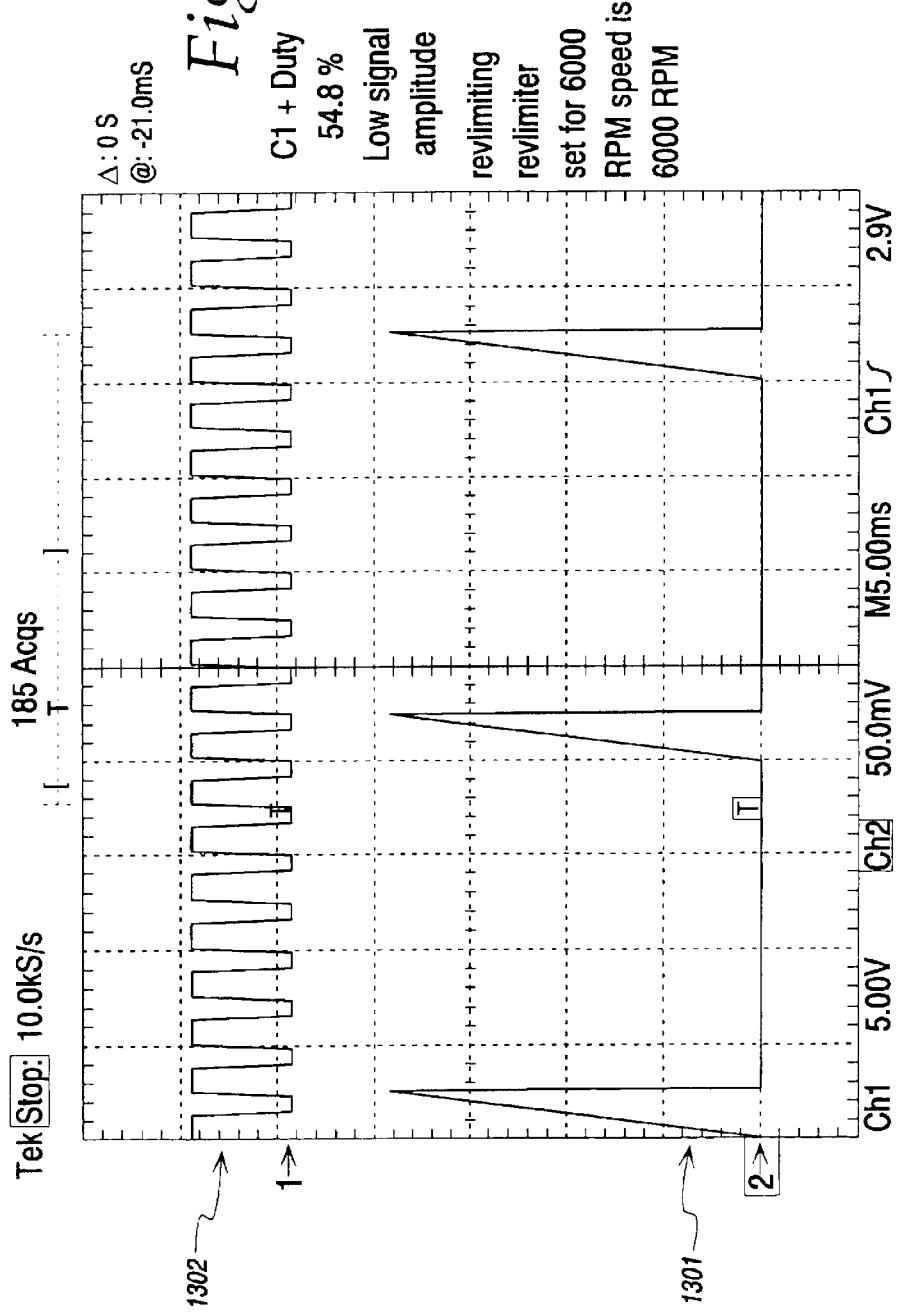
FIG. 13 is a graph of high current ignition with 1.3 mH primary at 19 amps peak primary current in high speed revlimiting operation in accordance with one embodiment of the present invention.

FIG. 13 shows the ignition operating at nearly full revlimit. The primary current 1301 is 90 percent of the full current limited value for the cylinders that are allowed to fire at that speed. As can be seen, the mag-input 1302 from a sensor does not always cause the engine to produce a spark, thereby revlimiting the engine.

Figure 14:
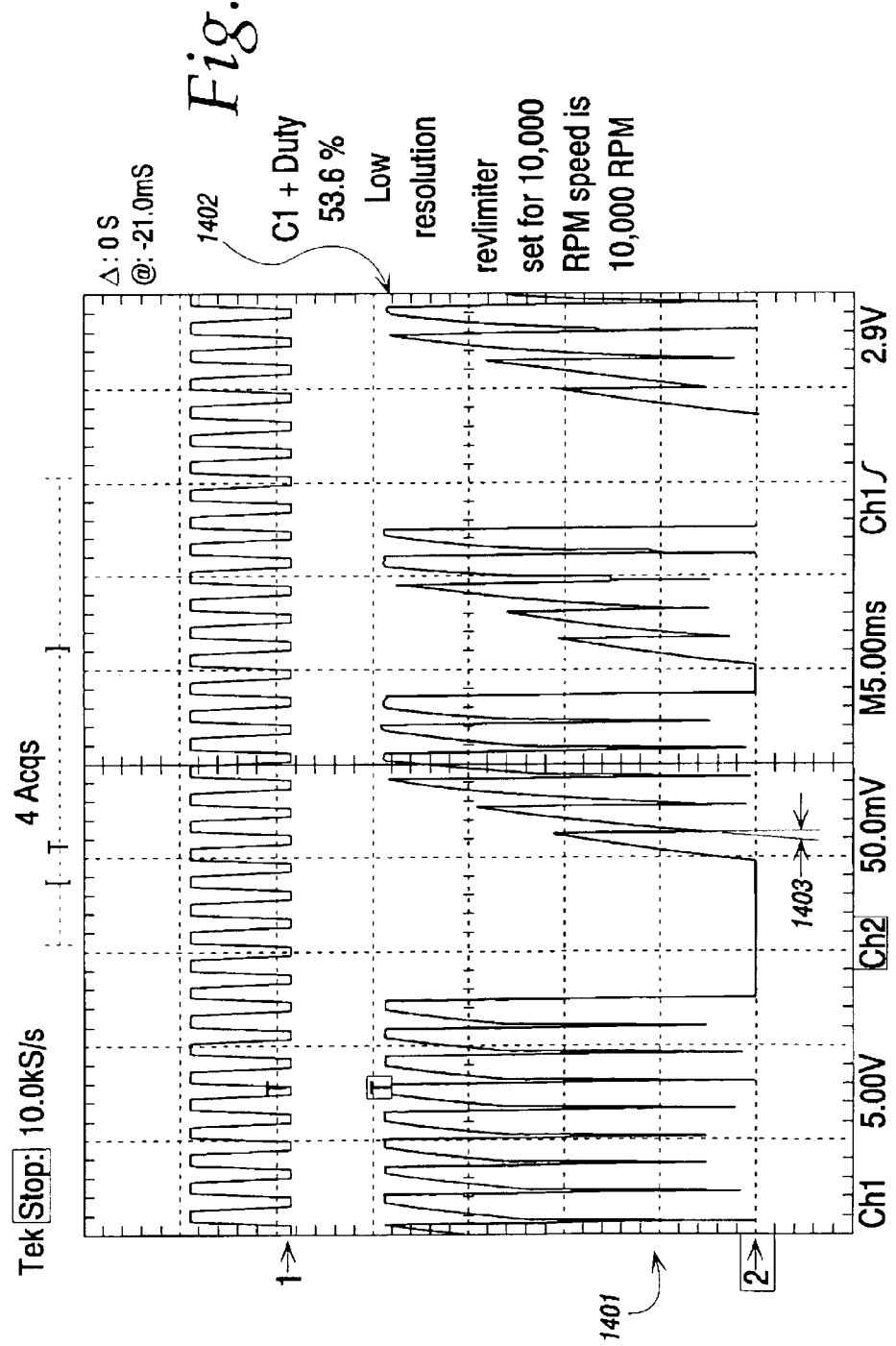
FIG. 14 is a graph of the ignition current of the primary coil and the comparator output during high-speed operation in revlimit operation in accordance with one embodiment of the present invention.

FIG. 14 shows the revlimiter operation at maximum speed, 10000 RPM. At this speed, the first coil dwell time of the coil current 1401 reaches about 50 percent of the full current value 1402 and continues to increase for the next two cycles until full current is reached. The minimum off time 1403 is then implemented to restore the full energy level.

As has been described above, the ignition also may include an auto-turnoff feature if the coil has been turned on which prevents continuous coil conduction. The coil current limited dwell time is limited during an engine shutdown or stall condition for 50 ms on time, from the time the coil current was turned on, then the current is linearly ramped down over total of 51 to 25 ms to near zero current at which time the output transistor is then turned off. A flag is set to indicate the current ramp off mode when the input lead edge has not been sensed in over 524 ms, indicating a stall condition, or coil current on time is over 50 ms. This current limit ramp is implemented by the microcontroller DAC output current reference ramping from the normal maximum value to zero volts.

In the embodiment of FIG. 3b, the PWM is ramped from 25 percent to 0 percent output. This gives quick but well controlled coil current turnoff, which prevents any output-sparks from the coil secondary.

Figure 15:
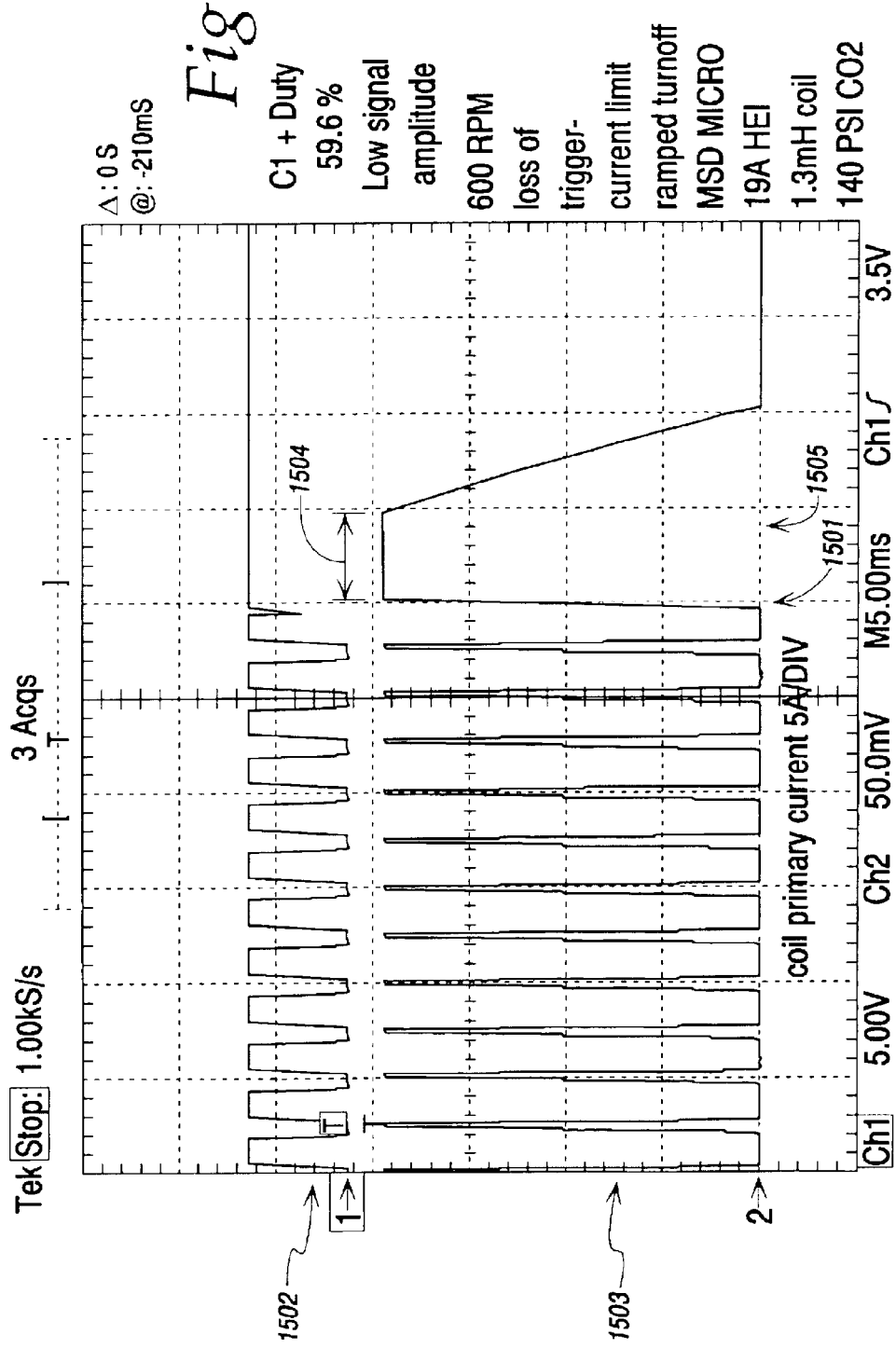
FIG. 15 is a graph of the ignition current waveform and the comparator output when the engine is stalled in accordance with one embodiment of the present invention.

FIG. 15 shows the engine stalled beginning at point 1501 where the mag-input signal 1502 does not return from a high value. The ignition coil current 1503 is held for a time 1504 (approximately 50 ms in this example) at the current limit value waiting for an input trigger event. When the input trigger event never occurs, the current is linearly ramped beginning at time 1505 to near zero current over 50 ms, in this example, and then the output coil current 1503 is turned off.

A traction control device itself may be connected to the ignition circuit using the two approaches as illustrated in FIG. 1. In the first approach, a traction control device 118a may be connected to the coil. In the second approach, a traction control device 118b may be connected to the M+ mag-input signal.

If the traction control device is connected to the coil negative terminal, ignition timing is effected to cause the coil primary current turnoff to be delayed for retarding the ignition timing. This approach can be implemented by hiding the external switch in a tachometer, whose tach-input signal is connected to the ignition coil negative terminal and which is also connected another coil primary switch to extend the coil primary dwell to retard the timing to effect traction control. This device operation is sensed by sensing the coil primary voltage rise when the ignition switch is turned off by sensing the primary voltage rise within narrow window of time in which the coil primary voltage should be present if the ignition is operating normally without a traction control device connected.

If the mag-input trigger signal is coupled to the traction control device, two approaches may be used to detect the traction control device. The first detection method via mag-input trigger signal is to measure the on time of the mag-input signal and compare the cycle to cycle time period of the mag-input signal while it is at +5 volts, or on, looking for a change in the on time relative to a ignition period change of approximately 12 percent, which is relative to an instantaneous retard of over 12 degrees of ignition timing when the traction control device is activated. This is done by using a microcontroller to compare the stored average on time of the mag-input signal to the last cycle on time for a change of + or −12 percent change relative to the ignition cycle period. When a valid detection is made, the ignition can then set a TCD flag, which is then used to studder or miss-perform ignition functions to cause the traction control device to miss-perform and cause the vehicle to slow rather than gain traction. The TCD flag can perform other operations as well, such as initiating a low speed revlimit or tach-output signal indicative of TCD such as missed-operation or duty cycle change. In addition, it may be desired to fix the maximum revlimit to a lower value such as 4000 RPM to keep the vehicle from being competitive with the traction control device attached and the revlimit once set may not be reset until power is removed or a minimum time of operation has elapsed to reset the TCD revlimit function.

Figure 16:
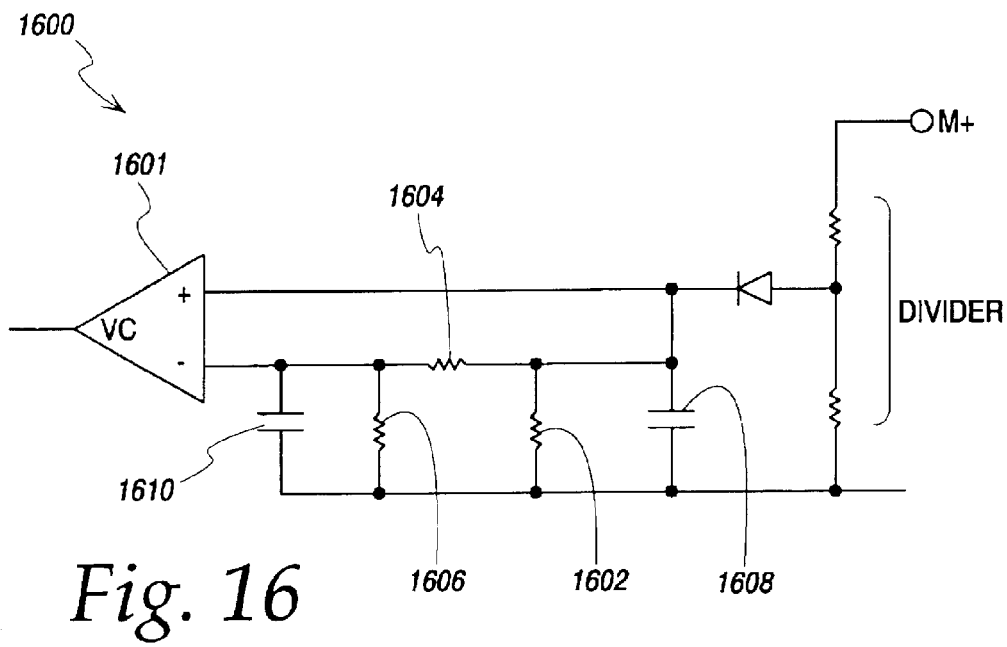
FIG. 16 is a circuit diagram of a TCD detection circuit in accordance with one embodiment of the present invention.

Referring now to FIG. 16, the second approach of traction control detection consists of performing mag-input signal amplitude rate of change measurements using a circuit 1600. This is done by peak rectifying the mag-input signal in the two-stage filter of FIG. 16 with differing discharge time constants. The mag-input signal M+ is first divided for a low amplitude signal that is input to the voltage comparator (VC) 1601 input pins. The first stage filter has a discharge time constant set mainly by 2 megaohm resistor 1602 and a parallel 620 kohm resistor 1604 in series with another 2 megaohm resistor 1606. These resistors discharge the first input filter capacitor 1608, which is a 0.022 microfarad capacitor and gives a discharge TC of 1.34200 megaohm*0.022 microfarad=25 milliseconds.

The second stage filter has a much longer discharge time constant that consists of the same 1.34200 megaohm equivalent resistance and a 0.047 microfarad capacitor 1610 giving a discharge TC of 63 milllseconds. Also, the combination of resistor 1604 and resistor 1606 provides an offset steady state bias at the voltage comparator (VC) 1601 noninverting input across the second stage filter. The second stage divider provides an attenuation of about 23 percent of the first stage voltage level. For a typical first stage voltage level of 150 millivolts, the second stage would be about 115 millivolts. The bias keeps the voltage comparator 1601 output in the on or high state under normal engine operation above 3000 RPM because the VC noninverting input is greater than the inverting input.

Traction control is detected via the mag-input when there is a rapid change in the amplitude by a decreasing mag-input voltage caused by the traction control device operation to retard the ignition timing. The voltage comparator 1601 senses this rapid decrease in mag-signal amplitude because the first stage filter voltage decreases at a discharge rate set by the discharge TC of 25 milliseconds, with the given TC in this example. Since the rate of the second stage filter has a longer discharge TC of 63 milliseconds, with the TC in this example, the VC inputs become oppositely biased for a period of time in which the VC output goes low and is detected at a microcontroller input that is polled every ignition cycle for a TCD event. Eventually, after many mag-input cycles at the new lower mag-input voltage filter levels, the VC inputs once again achieve a steady bias in which the non-inverting input is larger than the inverting input and the VC output goes to the normal state of on or high output. The microcontroller polls the VC TCD input each cycle and it must see the TCD low level for a minimum number of cycles to validate the TCD to discriminate from possible noise. In the present embodiment, the TCD must be seen 4 cycles for a valid TCD event to be flagged. This is quite easily done given a mag-input amplitude change of greater than 30 percent and is normally detected within 48 ignition cycles of the TCD event occurrence. The same modes of ignition operation take place after the TCD flag as in previous detection methods.

The microcontroller discriminates when to set the TCD flag when poling the TCD VC input using mag-signal amplitude change method of detection. The microcontroller has several rules, which control the TCD operation. The rules include that the average engine speed must be above a minimum RPM, the engine must not be decelerating more than 2 percent of the last speed average or at a rate of 5200 RPM/sec or more and the TCD has been detected for 4 consecutive ignition cycles. During rapid engine speed deceleration the TCD is disabled to prevent erroneous TCD captures and below a certain minimum engine RPM, such as 4000 RPM.

At idle and start up engine speeds the microcontroller polls the TCD VC on the mag-input lead and trail signal edges. The VC signal is oscillating between a high and low signal at low RPM and allows the microcontroller to verify that the TCD VC is still connected to the microcontroller input and is functioning. If the TCD VC signal is not detected at low engine RPM then the microcontroller can enforce a TCD mode of operation to occur for detecting a modification of the TCD circuitry by someone whom has modified the ignition circuit trying to disable the TCD sensing ability of the ignition, but resulting in a TCD mode of operation by the input circuit being circumvented. In this way, the TCD circuit is functional to allow normal ignition operation and cannot be removed without the ignition knowing it is missing an important signal for correct operation and detection of traction control devices added to this ignition circuit.

Figure 17:
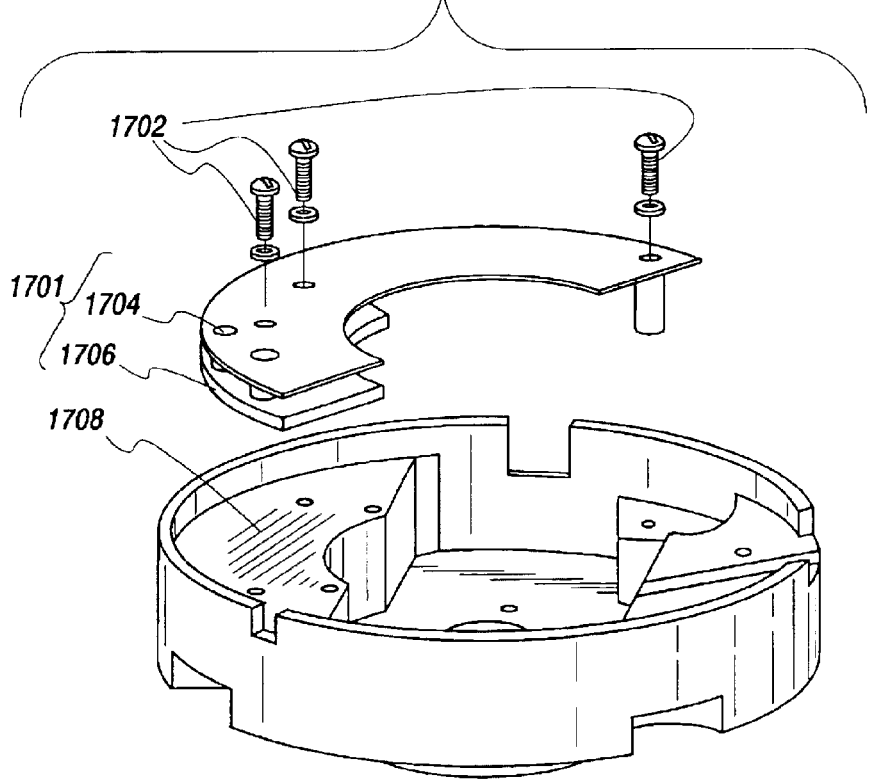
FIG. 17 is a perspective drawing showing the HEI system fitting into a distributor housing in accordance with one embodiment of the present invention.

Referring, now to FIG. 17, a block diagram illustrating the compact size and configuration of the HEI circuit is described. An HEI circuit 1701 includes a printed circuit board (PCB) 1704 and an metal (e.g., aluminum) insulated substrate 1706. In one example, the metal substrate 1706 is in contact with distributor base 1708 and may include the IGBTs, which are surface mounted components and soldered directly to an aluminum insulated substrate. The substrate 1706 may also include other components such as low power, surface-mounted resistors. The use of an insulated metal substrate for mounting the power transistors and low power resistors greatly improves the power dissipation of these components by providing a very efficient, low thermal resistant path, for heat removal to the distributor housing 1708. In addition, the PCB 1704 may be a printed circuit board, which includes all the other system components.

A special connector (not shown) provides the connection between the substrate 1704 and the PCB 1706. This connector provides for three-axis movement between the circuit board 1706 and substrate 1704 due to thermal expansion and vibrations encountered in the distributor housing. In one example, the connector is a S-TAB header assembly from Autospilce, Inc.

The circuit 1701 is semicircular in shape and fits conveniently into a distributor base 1708. In one example, the circuit 1701 is approximately 5 inches in diameter, about 180 degrees in arc, and ⅜ of an inch thick. The circuit 1701 is secured to the base 1708 by the screws 1702. As is apparent in reference to FIG. 17, the circuit 1701 is compact in size and easily fits into existing distributor housings.

Figure 18:
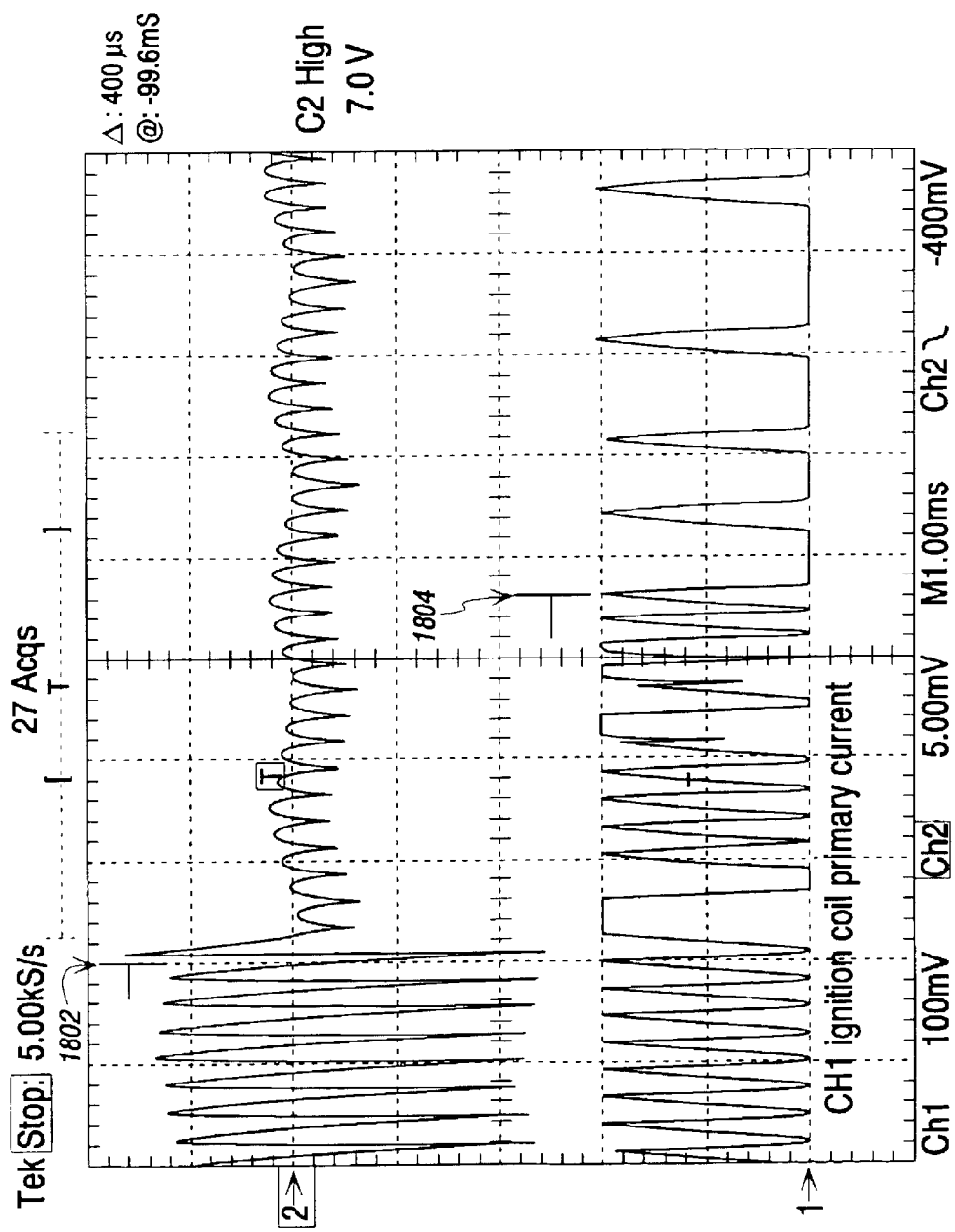
FIG. 18 is a graph of the mag-pickup input when modified with a traction control device and resulting primary current studder mode of operation in accordance with one embodiment of the present invention.

Referring now to FIG. 18, a timing diagram of the mag-pickup input with a traction control device connected is illustrated. When the traction control device is activated to retard timing, the amplitude of the waveform is attenuated by over 50 percent, and, in one example, is detected by the ignition TCD circuitry, at which time the output goes into studder mode eliminating one out of three sparks for 48 ignition cycles. More ignition outputs are inhibited because of the very low amplitude and mag-signal ripple cause by the traction control device. At point 1802, traction control retarding ignition timing by effecting the mag-input signal. At point 1804, the ignition has detected and validated the traction control device and begins studdering the coil output, inhibiting one out of three sparks for 48 cycles.

Figure 19:
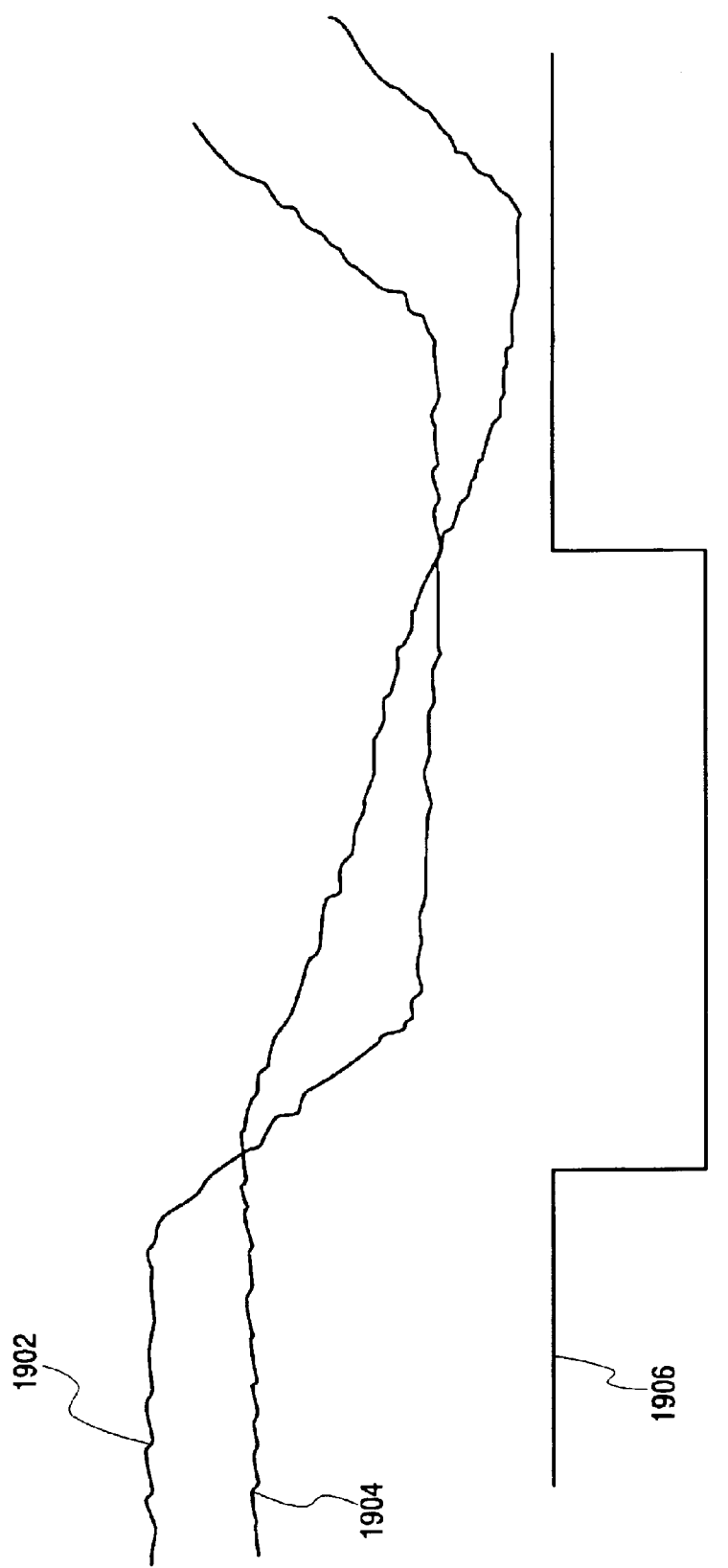
FIG. 19 is a graph of operation of the comparator of FIG. 16 in accordance with one embodiment of the present invention.

Referring now to FIG. 19, a timing diagram showing the operation of the comparator 1601 shown in FIG. 16 is described. The figure shows the VC+ input 1902 to the comparator 1601, the VC-input 1904 to the comparator 1601, and the output 1906 of the comparator 1601. The normal operation shows the VC+ input 1902 is greater than the VC-input 1904 until a rapid change in the mag-input signal amplitude when the traction control device retards timing and attenuates the mag-input signal. The VC inputs 1902 and 1904 have differing discharge time constants to sense the rapid change in mag-input voltage t detect a TCD event and this is shown in FIG. 19 by the VC output 1906 going low.

Figure 20:
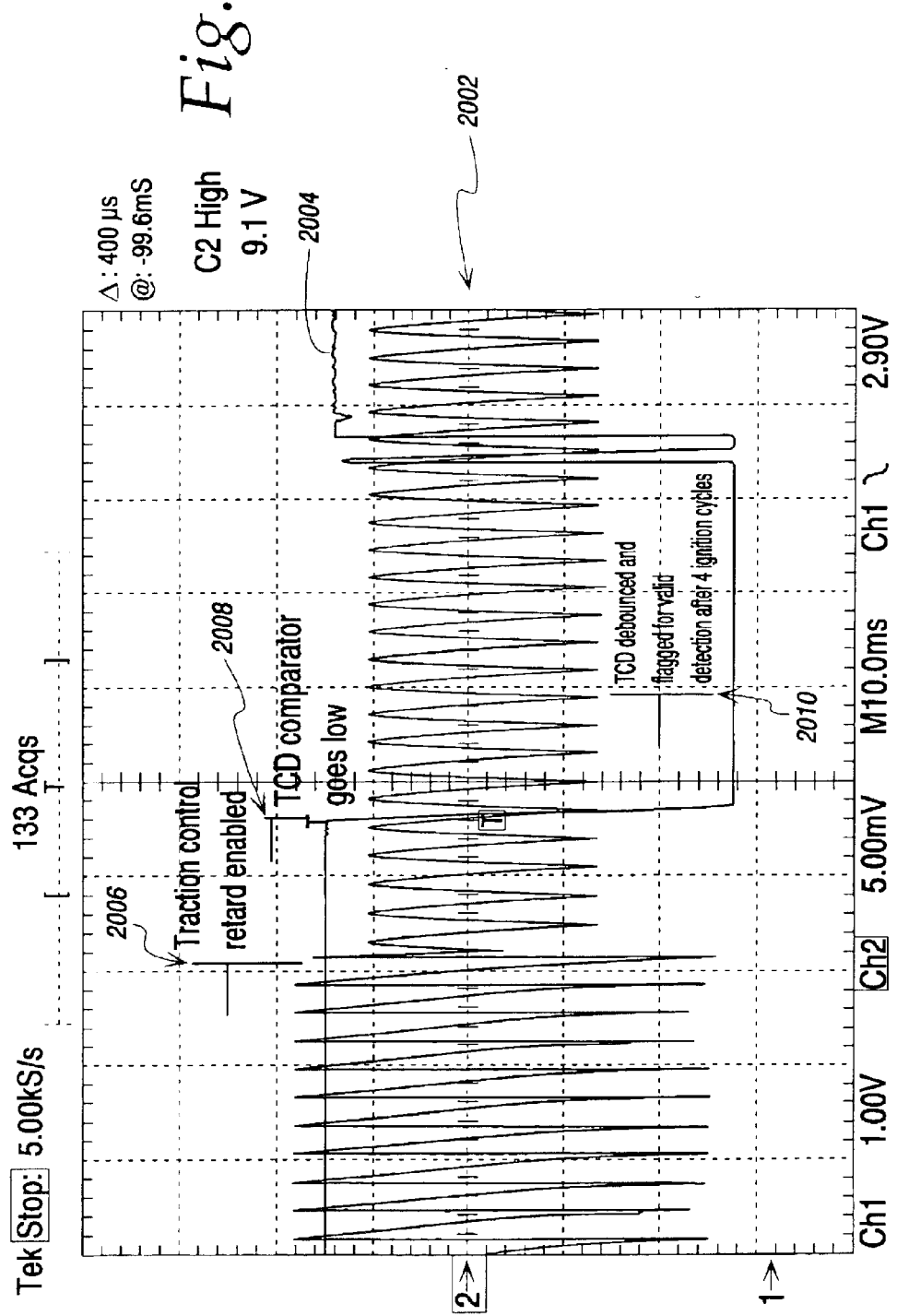
FIG. 20 is a graph showing the threshold test for detection of a traction control device in accordance with one embodiment of the present invention.

Referring now to FIG. 20, a threshold test for the TCD is described. The mag input 2002 is shown and it can be seen that the amplitude is attenuated when the traction control device retards timing. The TCD comparator output 2004 goes low when the amplitude drops more than 30 percent. At point 2006, the traction control retard becomes enabled. At point 2008, the TCD comparator output goes low. At point 2010, the TCD is debounced and flagged for valid detection after 4 ignition cycles.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A method of managing the energy stored in a single ignition coil of a distributor inductive ignition for an engine, the engine comprising a plurality of cylinders and the ignition coil having dwell control parameters, the method comprising:

operating the engine in different operating speed ranges;
determining at least one engine performance parameter;
adjusting at least one dwell control parameter of the ignition coil in all of the different speed ranges, the adjustment based at least in part upon an evaluation of the at least one engine performance parameter;
firing the cylinders of the engine; and
altering the stored energy of the ignition coil to an optimum value between the firings of the engine cylinders, the altering being made for each of the different speed ranges and as a result of the adjusting of the dwell control parameters.

2. The method of claim 1 wherein the performance parameters are selected from the operating speed of the engine, the operating mode of the engine, and the performance of the engine during use of a particular margin value.

3. The method of claim 1 wherein the dwell control parameters are selected from a ramp time of an ignition coil, an excess dwell time period of the ignition coil, an instantaneous turn-on time of the ignition coil, a turn-off time period of the ignition coil, and an instantaneous turn-off time of the ignition coil.

4. The method of claim 1 further comprising determining a ramp time based upon a desired excess dwell time, determining a current limit value, and increasing a current supply to the ignition coil to the target current value over the ramp time.

5. The method of claim 1 further comprising turning off a current supply at the ignition coil at a turn-off time and adjusting the turn-off time based upon the excess dwell time.

6. The method of claim 5 further comprising determining whether the coil has reached a full current value during a first cycle and adjusting the turnoff time of a second cycle to a predetermined minimum value.

7. The method of claim 1 wherein adjusting the dwell control parameters of the engine includes adjusting the excess dwell time in fixed increments based at least in part upon the operating mode of the engine and the engine speed.

8. The method of claim 1 further comprising determining a current limit and operating the engine in a cranking mode and turning off the current to the primary ignition coil while in cranking mode to generate a spark when the primary current to the coil reaches the current limit.

9. The method of claim 1 further comprising measuring the engine speed, determining when the engine speed exceeds a predetermined rev limit value and preventing the coil from activating when the engine speed exceeds the predetermined rev limit value.

10. The method of claim 1 further comprising:
sensing the magnitude of an excess dwell error for a selected dwell time;
adjusting the dwell time proportionally based upon the sensed excess dwell error;
determining whether the dwell time meets at least one predetermined criteria; and
reducing the dwell time based upon whether the dwell time met at least one of the predetermined criteria.

11. The method of claim 1 further comprising:
detecting number of missed excess dwell cycles;
detecting the number of double excess dwell cycles; and
adjusting a coil-off time and a minimum coil-off time based upon the number of missed excess dwell cycles and double excess dwell cycles.

12. The method of claim 1 further comprising detecting the presence of a traction control device.

13. The method of claim 12 wherein the detecting the presence includes determining whether the traction control device is connected to a mag-input signal.

14. The method of claim 13 wherein the detecting the presence includes measuring the amplitude rate of change in the mag-input signal.

15. The method of claim 13 wherein the detecting the presence includes measuring on time and comparing from cycle to cycle.

16. The method of claim 13 wherein the detecting the presence includes measuring the high time of the mag-input signal, averaging the high time, and comparing the average to an instantaneous high time of the mag-input signal.

17. The method of claim 12 wherein the detecting the presence includes determining whether the traction control device is connected to an ignition coil primary.

18. The method of claim 17 wherein the detecting the presence includes sensing voltage rise of the coil primary.

19. The method of claim 12 wherein the detecting the presence includes using functional circuitry that cannot be removed without detection.

20. A device for managing the energy in a single ignition coil of a distributor-based ignition system comprising:
a sensor for sensing engine operating parameters of an engine;
a controller coupled to the sensor and having an output indicating dwell control parameters of an ignition coil;
wherein the dwell control parameters are adjusted based upon the engine operating parameters such that the coil energy stored in the single ignition coil is adjusted and managed at all operating speeds of the engine.

21. The device of claim 20 wherein the controller includes means for increasing the current to the ignition coil to a value over a ramp time and adjusting the ramp time based upon a desired excess dwell time.

22. The device of claim 20 further comprising a primary ignition coil coupled to the controller and wherein the controller includes means for turning off a current supply at the primary coil at a turn-off time and means for adjusting the turn-off time based upon the dwell time.

23. The device of claim 20 wherein the controller includes means for adjusting an excess dwell time in fixed increments based at least in part upon the operating mode and engine speed.

24. The device of claim 20 further comprising a primary ignition coil coupled to the controller and wherein the controller includes means for operating the engine is in a cranking mode and turning off a current supply to the primary ignition coil while the engine is in cranking mode to generate a spark when the primary current to the coil reaches a current limit.

25. The device of claim 20 further comprising a traction control device coupled to the controller and the controller includes means (or detecting the traction control device.

26. The device of claim 25 wherein the means for detecting includes means for determining whether the traction control device is connected to a mag-input signal.

27. The device of claim 26 wherein the means for detecting includes means for measuring the amplitude rate of change in the mag-input signal.

28. The device of claim 26 wherein the means for detecting includes means for measuring on time and comparing from cycle to cycle.

29. The device of claim 26 wherein the means for detecting includes measuring the high time of the mag-input signal, averaging the high time, and comparing the average to an instantaneous high time of the mag-input signal.

30. The device of claim 25 wherein the means for detecting includes means for determining whether the traction control device is connected to an ignition coil primary.

31. The device of claim 30 wherein the means for detecting includes means for sensing voltage rise of the coil primary.

32. The device of claim 25 wherein the means for detecting includes functional circuitry that cannot be removed without detection and without affecting the operation of the system.

33. The device of claim 30 wherein the primary ignition coil has an inductance of at least 1 mH and stores from 160 to 250 mJ of energy.

34. The device of claim 20 further comprising means for producing a tach-out signal providing a fixed duty cycle at all engine speeds.

* * * * *